(12) United States Patent
Koshino et al.

(10) Patent No.: US 9,755,469 B2
(45) Date of Patent: Sep. 5, 2017

(54) SEGMENT COIL, STATOR INCLUDING SEGMENT COIL, AND METHOD OF MANUFACTURING SEGMENT COIL

(71) Applicants: TOYOTA JIDOSHA KABUSHIKI KAISHA, Toyota-shi, Aichi-ken (JP); Sumitomo Electric Industries, Ltd., Osaka-shi, Osaka (JP)

(72) Inventors: Naoto Koshino, Okazaki (JP); Shinichi Iizuka, Osaka (JP); Hironobu Saka, Osaka (JP); Takeshi Ariyoshi, Osaka (JP); Takashi Hirakushi, Osaka (JP)

(73) Assignees: Toyota Jidosha Kabushiki Kaisha, Toyota-shi, Aichi-ken (JP); Sumitomo Electric Industries, Ltd., Osaka-shi, Osaka (JP)

( * ) Notice: Subject to any disclaimer, the term of this patent is extended or adjusted under 35 U.S.C. 154(b) by 723 days.

(21) Appl. No.: 14/354,311

(22) PCT Filed: Oct. 22, 2012

(86) PCT No.: PCT/JP2012/077191
§ 371 (c)(1),
(2) Date: Apr. 25, 2014

(87) PCT Pub. No.: WO2013/061903
PCT Pub. Date: May 2, 2013

(65) Prior Publication Data
US 2014/0265711 A1   Sep. 18, 2014

(30) Foreign Application Priority Data

Oct. 27, 2011 (JP) .................................. 2011-235979
Jan. 16, 2012 (JP) .................................. 2012-005797
(Continued)

(51) Int. Cl.
*H02K 3/50* (2006.01)
*H02K 3/28* (2006.01)
(Continued)

(52) U.S. Cl.
CPC ................. *H02K 3/28* (2013.01); *H02K 3/12* (2013.01); *H02K 3/34* (2013.01); *H02K 3/38* (2013.01);
(Continued)

(58) Field of Classification Search
CPC .. H02K 3/28; H02K 3/12; H02K 3/34; H02K 3/38; H02K 3/50; H02K 15/0068; H02K 15/02; H02K 15/0421
USPC .................................................. 310/198, 196
See application file for complete search history.

(56) References Cited

U.S. PATENT DOCUMENTS 4,207,482 A * 6/1980 Neumeyer ............. H01B 3/004
174/DIG. 22
4,675,591 A * 6/1987 Pleiss ...................... H02P 1/32
310/184
(Continued)

FOREIGN PATENT DOCUMENTS

JP          56022548     *  3/1981  ............... H02K 3/32
JP          58-157350       9/1983
(Continued)

Primary Examiner — Terrance Kenerly
(74) Attorney, Agent, or Firm — Finnegan, Henderson, Farabow, Garrett & Dunner, LLP

(57) ABSTRACT

Segment coils arranged as aligned in slot portions of an annular core each include a straight portion and a pair of coil end portions, and have a tip end of the coil end portion of the pair of coil end portions as a tip end portion for joint including a joint surface for joint to another segment coil. The tip end portion for joint has the joint surface in parallel to a radial direction of the annular core when viewed in an axial direction of the annular core.

21 Claims, 20 Drawing Sheets

(30) Foreign Application Priority Data

| Jan. 30, 2012 | (JP) | 2012-016236 |
| Feb. 2, 2012 | (JP) | 2012/020859 |
| Feb. 7, 2012 | (JP) | 2012-023874 |
| Mar. 1, 2012 | (JP) | 2012-045004 |
| Sep. 10, 2012 | (JP) | 2012-198558 |

(51) Int. Cl.

| *H02K 3/12* | (2006.01) |
| *H02K 3/38* | (2006.01) |
| *H02K 15/00* | (2006.01) |
| *H02K 15/04* | (2006.01) |
| *H02K 3/34* | (2006.01) |
| *H02K 15/02* | (2006.01) |

(52) U.S. Cl.
CPC .......... *H02K 3/50* (2013.01); *H02K 15/0068* (2013.01); *H02K 15/02* (2013.01); *H02K 15/0421* (2013.01); *Y10T 29/49009* (2015.01)

(56) References Cited

U.S. PATENT DOCUMENTS

| 6,181,044 | B1 | 1/2001 | Umeda et al. |
| 6,288,462 | B1* | 9/2001 | Tanaka ................ H02K 3/50 |
| | | | 310/208 |
| 6,462,453 | B1 | 10/2002 | Asao et al. |
| 2002/0057031 | A1* | 5/2002 | Ueda ................... H02K 3/18 |
| | | | 310/208 |
| 2008/0231136 | A1 | 9/2008 | Obata |
| 2010/0141078 | A1 | 6/2010 | Kouda et al. |
| 2011/0198953 | A1 | 8/2011 | Shinohara et al. |
| 2012/0049687 | A1* | 3/2012 | Osborne ............. B23K 20/129 |
| | | | 310/211 |

FOREIGN PATENT DOCUMENTS

| JP | 02060439 | * | 2/1990 | ............. H02K 3/34 |
| JP | 5-268737 | | 10/1993 | |
| JP | 6-23209 | | 3/1994 | |
| JP | 2000-166150 | | 6/2000 | |
| JP | 2000-228853 | | 8/2000 | |
| JP | 2001-54247 | | 2/2001 | |
| JP | 2001-238419 | | 8/2001 | |
| JP | 2004-64989 | | 2/2004 | |
| JP | 2004064989 | * | 2/2004 | ............. H02K 3/04 |
| JP | 2005-65363 | | 3/2005 | |
| JP | 2005-224028 | | 8/2005 | |
| JP | 2008-125328 | | 5/2008 | |
| JP | 2008-236924 | | 10/2008 | |
| JP | 2010-28943 | | 2/2010 | |
| JP | 4688003 | | 5/2011 | |
| JP | 2012-16282 | | 1/2012 | |
| WO | WO 2011/102150 A1 | | 8/2011 | |

* cited by examiner

SEGMENT COIL, STATOR INCLUDING SEGMENT COIL, AND METHOD OF MANUFACTURING SEGMENT COIL

CROSS-REFERENCE TO RELATED APPLICATIONS

This application is a national phase application of International Application No. PCT/JP2012/077191, filed Oct. 22, 2012, and claims the priority of Japanese Application Nos. 2011-235979, filed Oct. 27, 2011; 2012-005797, filed Jan. 16, 2012; 2012-016236, filed Jan. 30, 2012; 2012-020859, filed Feb. 2, 2012; 2012-023874, filed Feb. 7, 2012; 2012-045004, filed Mar. 1, 2012; and 2012-198558, filed Sep. 10, 2012, the content of all of which is incorporated herein by reference.

TECHNICAL FIELD

The present application claims priority to Japanese Patent Applications Nos. 2011-235979, 2012-005797, 2012-016236, 2012-020859, 2012-023874, 2012-045004, and 2012-198558 filed on Oct. 27, 2011, and Jan. 16 and 30, Feb. 2 and 7, Mar. 1, and Sep. 10, 2012, respectively, the disclosure of which is incorporated by reference herein in its entirety.

The present invention relates to a segment coil, a stator including the segment coil, and a method of manufacturing the segment coil.

BACKGROUND ART

With reduction in size, higher performance, and higher output of a motor in recent years, a coil formed from a rectangular wire capable of achieving an effectively improved space factor in a slot, in particular, what is called a segment coil obtained by forming a rectangular wire substantially in a U shape, has increasingly been demanded as a coil forming a stator of a motor.

A stator including such segment coils is generally formed by arranging a plurality of segment coils as aligned in slots of the stator and thereafter joining end portions of adjacent segment coils through arc-welding.

For example, PTDs 1 and 2 below exemplify related techniques showing such a segment coil.

CITATION LIST

Patent Document

PTD 1: Japanese Patent Laying-Open No. 2005-224028
PTD 2: Japanese Patent Laying-Open No. 2000-166150

SUMMARY OF INVENTION

Technical Problem

PTD 1 is directed to an invention relating to an apparatus and a method of joining a segment coil, and it is advantageous in its ability to provide an apparatus and a method of joining a segment coil, which are fully automatic, maintain product quality, and are high in productivity without production cost being disadvantageous.

PTD 2 is directed to an invention relating to a stator of an AC generator for a vehicle, and it is advantageous in its ability to provide a stator of an AC generator for a vehicle in which a distance between joint portions can be secured.

PTDs 1 and 2, however, are poor in operability because end portions of segment coils to mutually be joined are joined for each set.

In PTDs 1 and 2, end portions of segment coils to mutually be joined are joined while a pressure is applied thereto in a radial direction of an annular core, and hence a space in a direction of pressurization is narrow, accuracy in positioning of a jig is strict, and operability is poor.

The segment coil includes an insulating layer for insulation between the segment coil and an adjacent segment coil and between the segment coil and a core. The insulating layer should be free from partial discharge between members. Partial discharge is likely in a portion where a voltage difference is great. For example, in a case that a segment coil is adopted in a stator of a three-phase AC motor, a voltage difference between segment coils belonging to different phases is greatest. Therefore, partial discharge is likely in a portion where segment coils belonging to different phases are in proximity to or in contact with each other.

In a conventional segment coil, an insulating layer capable of accommodating a voltage difference between segment coils belonging to different phases is provided in the entire region of the segment coil so as to prevent partial discharge.

A voltage difference at a site where segment coils belonging to the same phase face each other or at a site where a core and a segment coil face each other is small, and hence it is not necessary to provide an insulating layer large in thickness which can accommodate a large voltage difference. Since an insulating layer capable of accommodating a voltage difference between coils belonging to different phases has been provided in the entire region of the conventional segment coil, a space factor in a slot has been low, which has led to increase in size of a motor and increase in amount of heat generation.

In order to raise a space factor, it is also possible to employ an expensive insulating material low in relative permittivity and high in insulation performance so as to form an insulating layer small in thickness over the entire segment coil, however, it leads to increase in manufacturing cost.

A surge-resistant motor aiming to mitigate a potential difference between insulating coating layers of adjacent windings by forming a conductive film over an insulating film of a conductor elemental wire has been proposed.

The conductive film, however, is formed by mixing a conductive powdery material such as carbon in a resin, and hence it is low in degree of expansion and contraction. Therefore, crack of a film is likely during working of a coil. Application to bending of a segment coil has thus been difficult.

If a conductive film is provided over the entire region of the segment coil, contact with the conductive film and resultant short circuiting are likely at the time of connection by exposure of a conductor elemental wire at a terminal, and working of a terminal has been difficult.

In order to construct a stator, segment coils in a plurality of types of forms are prepared, these segment coils are attached and assembled in a prescribed order to a prescribed slot, and thereafter a tip end portion for joint of each segment coil should be connected such that these segment coils constitute an integrated coil.

An operation for attaching and connecting the segment coils, however, is burdensome. In addition, since a large number of segment coils should be assembled while they are close to one another, it is difficult to identify each segment coil and a tip end portion for joint to which it should be connected. Therefore, erroneous assembly or erroneous connection is likely.

Furthermore, since segment coils are provided closely to one another, it is difficult also to check erroneous assembly or erroneous connection after assembly or connection, and checking imposes extreme burdens.

The present invention aims to solve the conventional problems and to provide a segment coil capable of allowing efficient joint of adjacent segment coils of segment coils arranged as aligned in slots of an annular core and effective prevention of deterioration of an insulating film in particular in a coil end portion, a stator including the segment coils, and a method of manufacturing the segment coil.

The invention of the present application aims to provide a segment coil capable of allowing flow of a high current by setting a large cross-sectional area of a coil and achieving prevention of partial discharge and improved performance of a motor with a space factor being raised.

The invention of the present application aims to solve the conventional problems and to provide a stator capable of allowing flow of a high current by setting a large cross-sectional area of a coil and achieving prevention of partial discharge and improved performance of a motor with a space factor being raised.

The invention of the present application aims to provide a segment coil capable of allowing easy identification of a large number of segment coils, attachment to a prescribed slot where each segment coil should be attached, and easy identification and connection of a tip end portion for joint to which a segment coil should be connected.

Solution to Problem

A segment coil according to the present invention has a first feature that, in a stator of a rotating electric machine formed from an annular core and rectangular wire coils of a plurality of phases, segment coils are arranged as aligned in a radial direction in slots of the annular core and coils in adjacent slots are arranged as aligned in a circumferential direction, the segment coil includes a straight portion accommodated in the slot and a pair of coil end portions protruding outward from the slot, a tip end of any one coil end portion of the pair of coil end portions is defined as a tip end portion for joint including a joint surface for joint to another segment coil, and the tip end portion for joint is constructed such that the joint surface is in parallel to a radial direction of the annular core when viewed in an axial direction of the annular core.

According to the first feature of the present invention, the segment coil is such that, in a stator of a rotating electric machine formed from an annular core and rectangular wire coils of a plurality of phases, segment coils are arranged as aligned in a radial direction in slots of the annular core and coils in adjacent slots are arranged as aligned in a circumferential direction, the segment coil includes a straight portion accommodated in the slot and a pair of coil end portions protruding outward from the slot, a tip end of any one coil end portion of the pair of coil end portions is defined as a tip end portion for joint including a joint surface for joint to another segment coil, and the tip end portion for joint is constructed such that the joint surface is in parallel to a radial direction of the annular core when viewed in an axial direction of the annular core. Therefore, when a plurality of segment coils are arranged as aligned in an annular core, a direction of pressurization of the tip end portion for joint can be set to a circumferential direction of the annular core.

Thus, a space (a gap) formed between adjacent slots can effectively be made use of for joint of a tip end portion for joint.

Therefore, a sufficient space can be secured in the direction of pressurization of the tip end portions for joint and operability in a step of joining tip end portions for joint can be improved. Therefore, efficient joint of adjacent segment coils can be realized.

By setting the joint surface of the tip end portion for joint to be in parallel to the radial direction of the annular core, when a plurality of segment coils are arranged as aligned in the annular core, a space (a gap) formed between adjacent slots can effectively be increased and a stator having a good heat dissipation property can be formed.

The segment coil according to the present invention has, in addition to the first feature of the present invention, a second feature that the segment coil has a pair of tip end portions for joint arranged at prescribed positions in the circumferential direction of the annular core and the pair of tip end portions for joint are arranged such that adjacent tip end portions for joint are displaced between an inner diameter side and an outer diameter side in a radial direction of the annular core when the segment coils are arranged as aligned in the slots of the annular core.

According to the second feature of the present invention, in addition to a function and effect of the first feature of the present invention, the segment coil has a pair of tip end portions for joint arranged at prescribed positions in the circumferential direction of the annular core and the pair of tip end portions for joint are arranged such that adjacent tip end portions for joint are displaced between an inner diameter side and an outer diameter side in a radial direction of the annular core when the segment coils are arranged as aligned in the slots of the annular core. Therefore, simply by arranging a plurality of segment coils as aligned in the annular core, a plurality of segment coils arranged in the same slot can be arranged while joint surfaces of the tip end portions for joint to mutually be joined are opposed to each other.

Since the joint surface is in parallel to the radial direction of the annular core, the joint surfaces of a plurality of sets of tip end portions for joint to mutually be joined can be arranged in a line in the radial direction of the annular core.

Therefore, joint of the plurality of sets of the tip end portions for joint can simultaneously (together) be achieved (multi-point simultaneous joint of the plurality of sets of tip end portions for joint can be realized).

Therefore, operability in the step of joining tip end portions for joint can further effectively be improved and efficient joint of adjacent segment coils can further be realized.

The segment coil according to the present invention has, in addition to the first or second feature of the present invention, a third feature that an additional insulating layer is provided in a prescribed region of a coil end portion including at least the tip end portion for joint, of the pair of coil end portions.

According to the third feature of the present invention, in addition to a function and effect of the first or second feature of the present invention, an additional insulating layer is provided in a prescribed region of a coil end portion including at least the tip end portion for joint, of the pair of coil end portions. Therefore, partial discharge can effectively be prevented.

The segment coil according to the present invention has, in addition to the third feature of the present invention, a fourth feature that the additional insulating layer is provided in a portion where segment coils belonging to different phases face each other.

According to the fourth feature of the present invention, in addition to a function and effect of the third feature of the present invention, the additional insulating layer is provided in a portion where segment coils belonging to different phases face each other. Therefore, a thickness of an insulating layer can be different in accordance with a voltage difference between adjacent coils or between a coil and a core. Partial discharge can thus efficiently be prevented without lowering in reliability. In addition, since an average thickness of an insulating layer can be decreased, reduction in weight can also be achieved. Manufacturing cost can also be reduced.

The segment coil according to the present invention has, in addition to the third or fourth feature of the present invention, a fifth feature that the additional insulating layer is formed on a radially inner surface and/or a radially outer surface of the annular core of the segment coil.

According to the fifth feature of the present invention, in addition to a function and effect of the third or fourth feature of the present invention, the additional insulating layer is formed on a radially inner surface and/or a radially outer surface of the annular core of the segment coil. Therefore, a region where an additional insulating layer is provided can further be reduced.

The segment coil according to the present invention has, in addition to any one of the third to fifth features of the present invention, a sixth feature that the coil end portion is formed in a mountain shape and the additional insulating layer is provided in an oblique side portion except for a portion in the vicinity of a peak portion of the mountain shape and portions in the vicinity of opposing mountain-foot portions and/or in a straight portion extending from the slot.

According to the sixth feature of the present invention, in addition to a function and effect of any one of the third to fifth features of the present invention, the coil end portion is formed in a mountain shape and the additional insulating layer is provided in an oblique side portion except for a portion in the vicinity of a peak portion of the mountain shape and portions in the vicinity of opposing mountain-foot portions and/or in a straight portion extending from the slot. Therefore, an additional insulating layer can readily and reliably be formed and lowering in insulation due to crack or peel-off of an additional insulating layer can effectively be prevented.

Namely, in order to prevent crack or peel-off of an additional insulating layer, an additional insulating layer is preferably provided in a prescribed region of a portion which is not bent or a portion bent at a large radius of curvature.

For example, in a case that a coil end portion is formed in a mountain shape, a portion in the vicinity of a peak portion of the mountain shape or a portion in the vicinity of a mountain-foot portion of the mountain shape representing transition from an oblique side of the mountain shape to a straight portion accommodated in a slot portion is bent at a radius of curvature 0.5 to 3 times as high as that for a long side in a rectangular cross-section of a coil. An oblique side portion except for the portion in the vicinity of the peak portion of the mountain shape and the portions in the vicinity of opposing mountain-foot portions is bent at a radius of curvature 20 to 60 times as high as that for the long side in the rectangular cross-section of the coil. A straight portion extending from a slot is not bent.

Therefore, by providing an additional insulating layer in an oblique side portion except for the portion in the vicinity of the peak portion of the mountain shape and the portions in the vicinity of opposing mountain-foot portions and/or in the straight portion, an additional insulating layer can readily and reliably be formed and lowering in insulation due to crack or peel-off of the additional insulating layer can effectively be prevented.

It is noted that the oblique side portion can be subjected to prescribed bending along a circumferential direction of the stator. As bending along the circumferential direction, for example, such bending as bending the oblique side portion at one or two or more location(s) to form a substantially polygonal shape or such bending as varying a center of a radius of curvature or a curvature can be performed.

The segment coil according to the present invention has, in addition to the first feature of the present invention, a seventh feature that a semiconductive layer is provided in a prescribed region of a coil end portion on a side not including at least the tip end portion for joint, of the pair of coil end portions, and the semiconductive layer of a segment coil arranged in proximity and belonging to a different phase is in contact at at least one point.

According to the seventh feature of the present invention, in addition to a function and effect of the first feature of the present invention, a semiconductive layer is provided in a prescribed region of a coil end portion on a side not including at least the tip end portion for joint, of the pair of coil end portions, and the semiconductive layer of a segment coil arranged in proximity and belonging to a different phase is in contact at at least one point. Therefore, by providing a semiconductive layer in a prescribed region of a coil end portion, charges at the surface of the coil are distributed and electric field intensity is lowered. As intensity of electric field is lowered, partial discharge is suppressed even though a voltage higher than a partial discharge inception voltage is generated in a case that no semiconductive layer is provided. Namely, even though segment coils belonging to different phases are adjacently arranged, a potential difference due to accumulation of charges does not increase between these segment coils and partial discharge at such a site can effectively be prevented.

Namely, according to the invention of the present application, semiconductive layers provided in segment coils belonging to different phases are in contact with each other at at least one point so that partial discharge between these segment coils can effectively be prevented. So long as contact at at least one point is achieved, a form of contact at the contact point is not limited. For example, not only point contact but also line contact or surface contact is acceptable. Even when a thickness of a semiconductive layer is small, an effect thereof can be exhibited. Therefore, as compared with the conventional technique of increasing a thickness of an insulating coating layer, a weight of a stator can be reduced and manufacturing cost can be reduced.

The segment coil according to the present invention has, in addition to any one of the first to seventh features of the present invention, an eighth feature that a colored identification portion is provided on a surface in a prescribed region of the segment coil.

According to the eighth feature of the present invention, in addition to a function and effect of any one of the first to seventh features of the present invention, a colored identification portion is provided on a surface in a prescribed region of the segment coil. Therefore, color identification can be used as an identification label in a step of assembling a stator, and a segment coil can be high in manufacturing efficiency.

The segment coil according to the present invention has, in addition to the eighth feature of the present invention, a ninth feature that a first colored identification portion allowing identification of a tip end portion for joint of a segment coil to be connected is provided in the tip end portion for joint of the segment coil or in a portion in the vicinity thereof.

According to the ninth feature of the present invention, in addition to a function and effect of the eighth features of the present invention, a first colored identification portion allowing identification of a tip end portion for joint of a segment coil to be connected is provided in the tip end portion for joint of the segment coil or in a portion in the vicinity thereof. Therefore, in a step of connecting a tip end portion for joint of each segment coil attached to a prescribed slot of the annular core, a tip end portion for joint to be connected can be identified and erroneous connection can effectively be prevented.

A construction or a form of the first colored identification portion is not particularly limited. For example, colored identification portions of the same color can be provided in tip end portions for joint of segment coils to be connected to each other or in the vicinity thereof. A site where a colored identification portion is provided is not particularly limited either, and a colored identification portion can be provided in a tip end portion for joint or in the vicinity thereof so as to allow identification of a tip end portion for joint during a connection operation.

By forming a first colored identification portion at a site allowing external identification after end of assembly, image recognition of the first colored identification portion is allowed so that whether connection is erroneous or not can be checked.

The segment coil according to the present invention has, in addition to the eighth or ninth feature of the present invention, a tenth feature of including a second colored identification portion provided on a surface other than the tip end portion for joint and formed to allow identification of a slot where each segment coil is attached and/or a position of disposition in the slot.

According to the tenth feature of the present invention, in addition to a function and effect of the eighth or ninth feature of the present invention, a second colored identification portion provided on a surface other than the tip end portion for joint and formed to allow identification of a slot where each segment coil is attached and/or a position of disposition in the slot is included. Therefore, a prescribed segment coil can readily be attached to a prescribed slot. In addition, an order of disposition in each slot can readily be checked. It is noted that a second colored identification portion provided for attachment of a prescribed segment coil to a prescribed slot and a second colored identification portion for identification of an order of disposition in each slot can be formed such that their roles are combined, or they can also be provided as independent colored identification portions at different sites.

The second colored identification portion provided for attachment of a prescribed segment coil to a prescribed slot can be formed, for example, to have the same color for each slot. In order to recognize a position of disposition of segment coils attached to each slot, for example, second colored identification portions colored in the same color such that density is varied in the order of disposition can be provided.

The segment coil according to the present invention has, in addition to the tenth feature of the present invention, an eleventh feature that the second colored identification portion is provided by applying a color paint, bonding a color tape material, or attaching a color tube material to a prescribed region of the segment coil.

According to the eleventh feature of the present invention, in addition to a function and effect of the tenth feature of the present invention, the second colored identification portion is provided by applying a color paint, bonding a color tape material, or attaching a color tube material to a prescribed region of the segment coil. Therefore, the second colored identification portion can readily be formed.

The second colored identification portion can be provided by coloring the entire or partial region of the coil end portion. The second colored identification portion should only be provided at least in the coil end portion. The second colored identification portion can also be provided by coloring the entire insulating layer of each segment coil.

The segment coil according to the present invention has, in addition to the tenth or eleventh feature of the present invention, a twelfth feature that the second colored identification portion serves as an additional insulating layer.

According to the twelfth feature of the present invention, in addition to a function and effect of the tenth or eleventh feature of the present invention, the second colored identification portion serves as an additional insulating layer. Therefore, not only an operation for assembling a stator can be facilitated but also a segment coil capable of achieving efficient prevention of partial discharge and improved reliability of a stator can be obtained.

A construction or a form of the second colored identification portion is not particularly limited. In order to effectively prevent partial discharge, for example, a required partial discharge voltage can be ensured by applying a paint composed of an insulating resin to a thickness from 20 to 200 μm. When a thickness is not greater than 20 μm, partial discharge may be likely between proximate coils and required strength of a film cannot be ensured. When a thickness is equal to or greater than 200 μm, it becomes difficult to ensure a space for attaching a coil.

A second colored identification portion also serving as an additional insulating layer can be formed by adopting an insulating tape material or an insulating tube material. As a color tape material having a partial discharge prevention effect, an insulating resin tape material manufactured by Permacel (trade name Kapton tape) can be adopted. An insulating resin tube manufactured by Sumitomo Electric Industries, Ltd. (trade name Sumitube) can be adopted as a color tube material.

The segment coil according to the present invention has, in addition to any one of the first to twelfth features of the present invention, a thirteenth feature of being composed of tough pitch copper.

According to the thirteenth feature of the present invention, in addition to a function and effect of any one of the first to twelfth features of the present invention, the segment coil is composed of tough pitch copper. Therefore, the segment coil can be excellent in electrical conductivity and thermal conductivity as well as good in workability. Manufacturing cost can be reduced.

A stator according to the present invention has a fourteenth feature of having the segment coils according to any one of claims 1 to 13 arranged as aligned in slots of an annular core.

According to the fourteenth feature of the present invention, the stator is such that the segment coils according to any one of claims 1 to 13 are arranged as aligned in slots of an annular core. Therefore, a segment coil can be reduced in size and deterioration of an insulating film can effectively be prevented.

The stator according to the present invention has, in addition to the fourteenth feature of the present invention, a fifteenth feature that, by inclining at least one set of adjacent segment coils arranged in the same slot among segment coils arranged as aligned in slots of the annular core in a radial direction in a region extending from the slot to a portion where it is bent in a circumferential direction toward a vertex of the coil end portion, an insulating layer provided in the coil end portion of the segment coil is formed such that the insulating layer is brought in contact in the radial direction of the stator and a distance between coils in the radial direction of the stator at a portion in contact is greater than a distance between coils within the slot.

According to the fifteenth feature of the present invention, in addition to a function and effect of the fourteenth feature of the present invention, by inclining at least one set of adjacent segment coils arranged in the same slot among segment coils arranged as aligned in slots of the annular core in a radial direction in a region extending from the slot to a portion where it is bent in a circumferential direction toward a vertex of the coil end portion, an insulating layer provided in the coil end portion of the segment coil is formed such that the insulating layer is brought in contact in the radial direction of the stator and a distance between coils in the radial direction of the stator at a portion in contact is greater than a distance between coils within the slot. Therefore, a high space factor in a slot can further be realized and the number of turns of a coil in the slot can effectively be increased.

Deterioration of an insulating film in at least one set of adjacent segment coils arranged in the same slot can further effectively be prevented.

The stator according to the present invention has, in addition to a function and effect of the fourteenth or fifteenth feature of the present invention, a sixteenth feature that tip end portions for joint of adjacent segment coils of the plurality of segment coils are solid-phase bonded.

According to the sixteenth feature of the present invention, in addition to a function and effect of the fourteenth or fifteenth feature of the present invention, tip end portions for joint of adjacent segment coils of the plurality of segment coils are solid-phase bonded. Therefore, a stator can be higher in manufacturing efficiency. In addition, since influence by heat is less, a conductor and a film material low in heat resistance and inexpensive can be used.

A method of manufacturing a segment coil according to the present invention is a method of manufacturing the segment coil according to claim 1, and it has a seventeenth feature of including a coil element forming step of forming a coil element by bending an elemental wire formed at least from a rectangular wire and an insulating layer forming step of forming an insulating layer by covering a surface of the coil element with an insulating substance, the coil element forming step including a tip-end-portion-for-joint forming step of forming at a tip end of a coil end portion of the coil element, a tip end portion for joint arranged at a prescribed position in a circumferential direction of an annular core such that a joint surface for joint to another segment coil is in parallel to a radial direction of the annular core when viewed in an axial direction of the annular core, and the insulating layer forming step including a base insulating layer forming step of forming a base insulating layer by integrally covering the coil element with an insulating substance and an additional insulating layer forming step of forming an additional insulating layer by additionally covering a prescribed region of the coil end portion with an insulating substance after the base insulating layer forming step.

According to the seventeenth feature of the present invention, the method of manufacturing a segment coil is a method of manufacturing the segment coil according to claim 1, and it includes a coil element forming step of forming a coil element by bending an elemental wire formed at least from a rectangular wire and an insulating layer forming step of forming an insulating layer by covering a surface of the coil element with an insulating substance, the coil element forming step includes a tip-end-portion-for-joint forming step of forming at a tip end of a coil end portion of the coil element, a tip end portion for joint arranged at a prescribed position in a circumferential direction of an annular core such that a joint surface for joint to another segment coil is in parallel to a radial direction of the annular core when viewed in an axial direction of the annular core, and the insulating layer forming step includes a base insulating layer forming step of forming a base insulating layer by integrally covering the coil element with an insulating substance and an additional insulating layer forming step of forming an additional insulating layer by additionally covering a prescribed region of the coil end portion with an insulating substance after the base insulating layer forming step. Therefore, when a plurality of segment coils are arranged as aligned in the annular core, a direction of pressurization of a tip end portion for joint can be set to a circumferential direction of the annular core. Therefore, a space (a gap) formed between adjacent slots can effectively be made use of for joint of a tip end portion for joint.

Therefore, a sufficient space can be secured in a direction of pressurization of a tip end portion for joint and operability in a step of joining tip end portions for joint can be improved. Therefore, a segment coil allowing efficient joint of adjacent segment coils can be manufactured.

By setting a joint surface of a tip end portion for joint to be in parallel to the radial direction of the annular core, a segment coil capable of allowing effective increase in space (gap) formed between adjacent slots when a plurality of segment coils are arranged as aligned in an annular core and allowing formation of a stator having a good heat dissipation property can be manufactured.

A segment coil allowing effective prevention of deterioration of an insulating film in particular in a coil end portion can be manufactured.

The method of manufacturing the segment coil according to the present invention has, in addition to the seventeenth feature of the present invention, an eighteenth feature that the tip-end-portion-for-joint forming step is performed by twisting an end portion of the coil end portion of the coil element.

According to the eighteenth feature of the present invention, in addition to a function and effect of the seventeenth feature of the present invention, the tip-end-portion-for-joint forming step is performed by twisting an end portion of the coil end portion of the coil element. Therefore, the tip end portion for joint can efficiently be formed.

The method of manufacturing the segment coil according to the present invention has, in addition to the seventeenth feature of the present invention, a nineteenth feature that the tip-end-portion-for-joint forming step is performed by plastically deforming an end portion of the coil end portion of the coil element.

According to the nineteenth feature of the present invention, in addition to a function and effect of the seventeenth feature of the present invention, the tip-end-portion-for-joint forming step is performed by plastically deforming an end portion of the coil end portion of the coil element. Therefore, the tip end portion for joint can efficiently be formed.

The method of manufacturing the segment coil according to the present invention has, in addition to any one of the seventeenth to nineteenth features of the present invention, a twentieth feature of having a colored identification portion forming step of providing prescribed coloring to a prescribed region of the surface of the coil element simultaneously with or subsequent to the additional insulating layer forming step.

According to the twentieth feature of the present invention, in addition to a function and effect of any one of the seventeenth to nineteenth features of the present invention, a colored identification portion forming step of providing prescribed coloring to a prescribed region of the surface of the coil element simultaneously with or subsequent to the additional insulating layer forming step is included. Therefore, a colored identification portion can efficiently be formed.

Advantageous Effects of Invention

According to the segment coil of the present invention, adjacent segment coils of segment coils arranged as aligned in slots of an annular core can efficiently be joined and a stator having a good heat dissipation property can be formed. Deterioration of an insulating film in particular in a coil end portion can effectively be prevented.

According to the stator of the present invention, the stator can achieve high manufacturing efficiency and a good heat dissipation property. Deterioration of an insulating film in particular in a coil end portion can effectively be prevented.

According to the method of manufacturing a segment coil in the present invention, a segment coil allowing efficient joint of adjacent segment coils and formation of a stator having a good heat dissipation property can be manufactured. A segment coil allowing effective prevention of deterioration of an insulating film in particular in a coil end portion can be manufactured.

Figure 1:
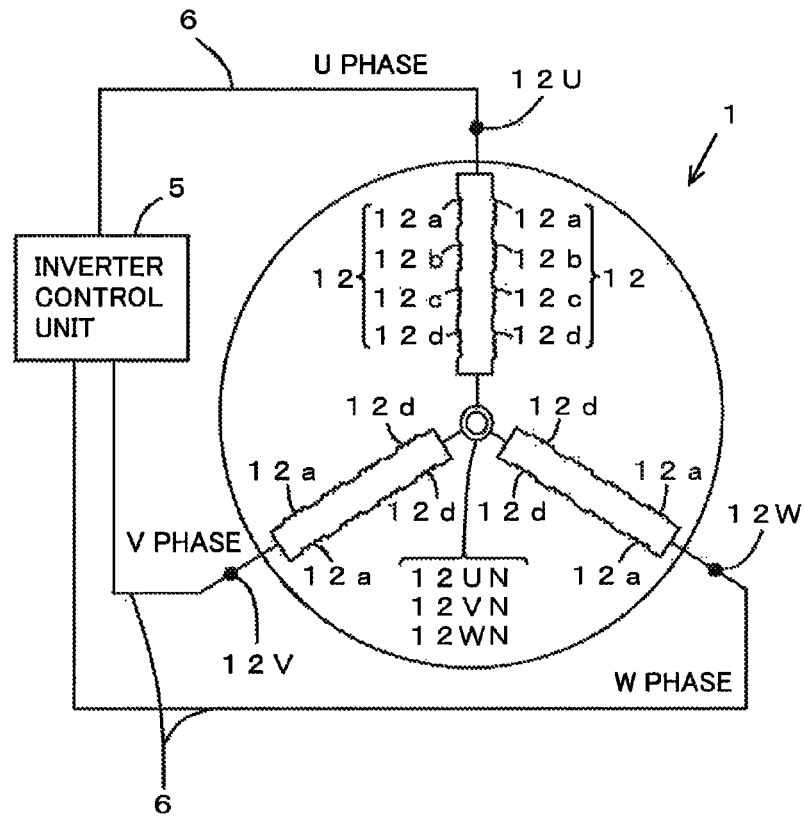
FIG. 1 is a schematic wiring diagram of a motor including segment coils according to an embodiment of the present invention.

REFERENCE SIGNS LIST 1 motor; 2 battery; 3 relay; 4 boost converter; 5 inverter control unit; 6 high-voltage cable; 10 stator; 11 annular core; 11a core main body; 11b tooth portion; 11c slot portion; 12 segment coil; 12a first wound coil; 12b second wound coil; 12c third wound coil; 12d fourth wound coil; 12U U-phase terminal; 12UN U-phase neutral point; 12V V-phase terminal; 12VN V-phase neutral point; 12W W-phase terminal; 12WN W-phase neutral point; 12-1 inner-diameter-side coil; 12-2 outer-diameter-side coil; 20 stator; 21 annular core; 21a core main body; 21b tooth portion; 21c slot portion; 22 segment coil; 22U U-phase terminal; 22V V-phase terminal; 22W W-phase terminal; 30 jig for joint; 40 first segment coil; 50 second segment coil; 60 third segment coil; 201 segment coil; 201A segment coil; 201B segment coil; 201C segment coil; 201D segment coil; 201E segment coil; 205a tip end portion for joint; 205b tip end portion for joint; 206 elemental wire; 207 base insulating layer; 210a oblique side portion; 211a oblique side portion; 212a additional insulating layer; 212b additional insulating layer; 212c additional insulating layer; 212d additional insulating layer; 214a additional insulating layer; 214b additional insulating layer; 214c additional insulating layer; 214d additional insulating layer; 212a additional insulating layer; 304 segment coil; 305 segment coil; 306 semiconductive layer; 308 elemental wire; 309 insulating layer; 407 elemental wire; 408 insulating layer; 451b first colored identification portion; 452a first colored identification portion; 452b first colored identification portion; 453a first colored identification portion; 453b first colored identification portion; 454a first colored identification portion; 454b first colored identification portion; 455a first colored identification portion; 465A1 first colored identification portion; 465B1 first colored identification portion; 465C1 first colored identification portion; 465D1 first colored identification portion; 505a tip end portion for joint; 505b tip end portion for joint; 562a color cap; 562b color cap; 570 second colored identification portion; 711 annular core; 711e slot portion; 711d end surface; 712 segment coil; A10 segment coil; A20 segment coil; A30 segment coil; A40 segment coil; A50 segment coil; B coil element; C straight portion; D length; E1 coil end portion; E2 coil end portion; E3 coil end portion; E4 coil end portion; F length; G outer-diameter-side coil surface; H extension portion; K1 first bent region; K2 second bent region; L space; M space; N inner-diameter-side coil surface; P space; Q space; R elemental wire; S tip end portion for joint; S1 joint surface; V contact point; Z insulating layer; Z1 base insulating layer; Z2 additional insulating layer; θ1 angle; and θ2 angle.

DESCRIPTION OF EMBODIMENTS

An embodiment of the present invention will specifically be described hereinafter with reference to the drawings.

Initially, for understanding of the present invention, a segment coil 12, a stator 10 including segment coil 12, a motor 1 including stator 10, and a method of manufacturing segment coil 12 according to a first embodiment of the present invention will be described initially with reference to the drawings below. The description below, however, is an embodiment of the present invention and does not limit the disclosure in the scope of claims for patent.

Motor 1 (a rotating electric machine) including segment coils according to the embodiment of the present invention will be described initially with reference to FIGS. 1 and 2.

Motor 1 according to the embodiment of the present invention is constituted of stator 10 which will be described later and a not-shown rotor.

Figure 2:
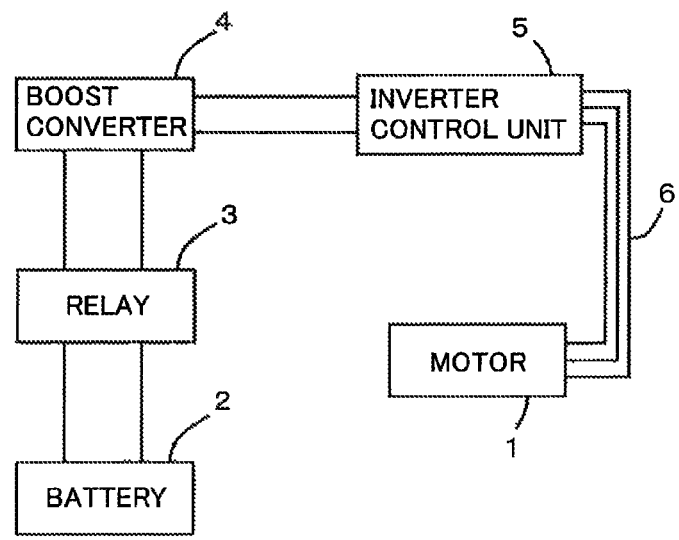
FIG. 2 is a schematic diagram showing a system for distribution to the motor.

As shown in FIGS. 1 and 2, this motor 1 is a three-phase motor of PWM drive (Pulse Width Modulation) supplied with electric power switched in inverter control. Specifically, as shown in FIG. 2, a voltage of electric power from a battery 2 is raised by a relay 3 and a boost converter 4, and electric power is supplied to motor 1 through an inverter control unit 5 including a switching element and input terminals of a U-phase, a V-phase, and a W-phase connected to a high-voltage cable 6. As shown in FIG. 1, the U-phase, the V-phase, and the W-phase are such that a pair of four wound coils connected in series are connected in parallel.

Any switching element such as a vertical MOSFET (Metal Oxide Semiconductor Field Effect Transistor), a lateral device, a thyristor, a GTO (Gate Turn-Off Thyristor), a bipolar transistor, and an IGBT (Insulated Gate Bipolar Transistor) can be employed as the switching element.

Stator 10 according to the embodiment of the present invention will now be described further in detail also with reference to FIGS. 3A to 9C.

Figure 3A:
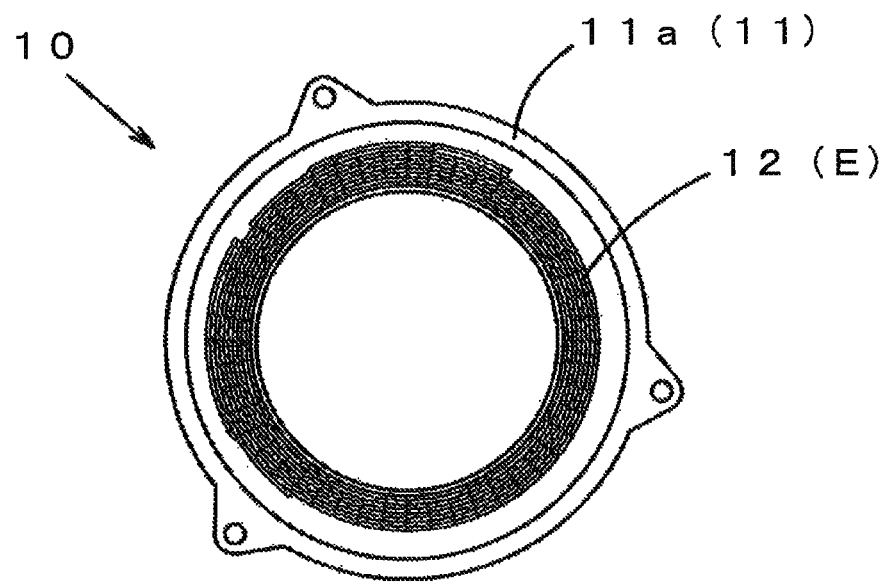
FIG. 3A is a plan view of a stator according to the embodiment of the present invention.
Figure 3B:
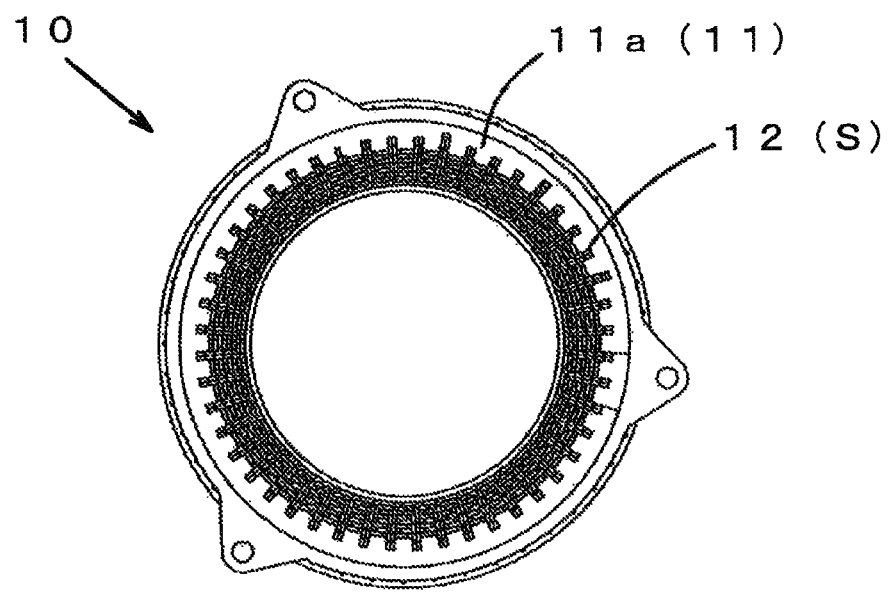
FIG. 3B is a bottom view of the stator according to the embodiment of the present invention.
Figure 4A:
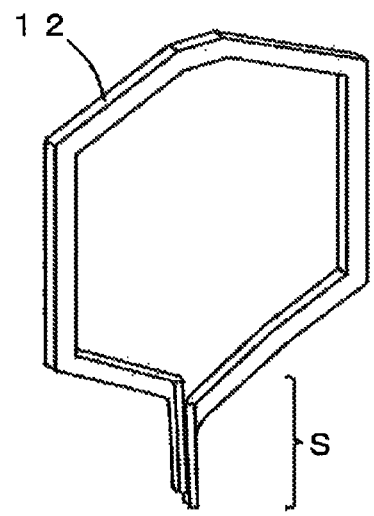
FIG. 4A is a perspective view of a segment coil according to a first embodiment of the present invention.
Figure 4B:
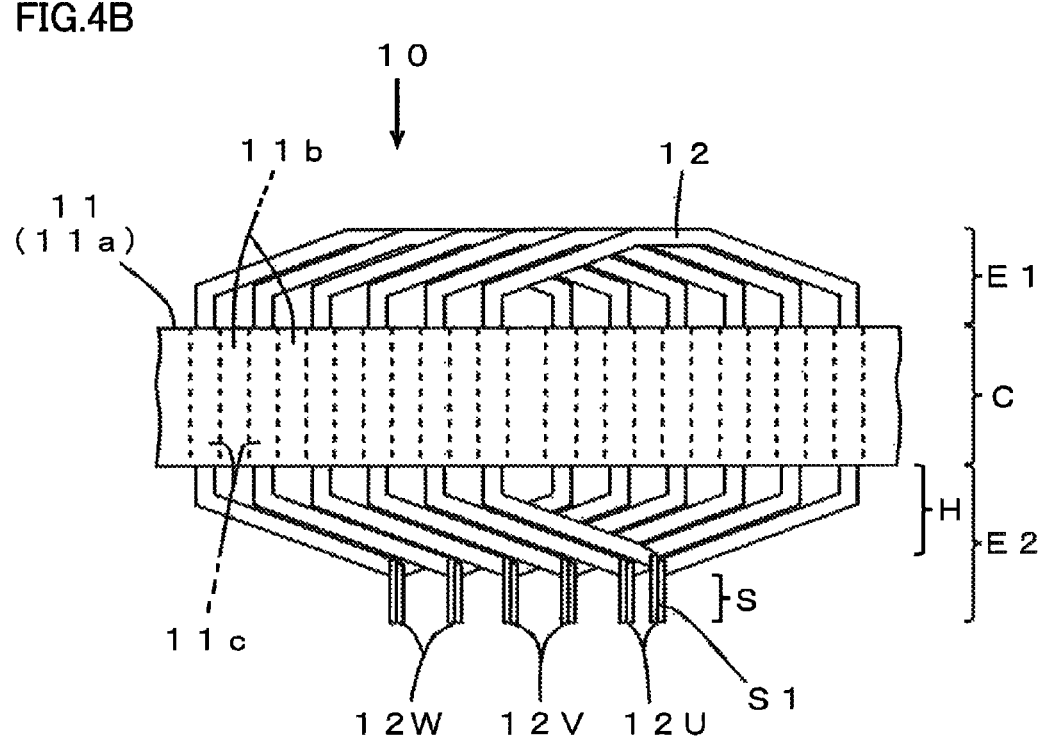
FIG. 4B is a diagram showing the segment coils according to the first embodiment of the present invention and a diagram showing in a simplified manner, a main portion when the segment coils assembled into an annular core are viewed from the outside of the annular core.

Stator 10 is a stator of motor 1 and it is constituted of an annular core 11 and segment coil 12 formed by shaping a rectangular wire coil substantially in a U shape as shown in FIGS. 3A, 3B, and 4B.

As shown in FIGS. 3A and 3B, annular core 11 is constituted of an annular core main body 11a and a plurality of annularly arranged tooth portions 11b as shown in FIG. 4B in a simplified manner. A plurality of slot portions 11 are formed on opposing sides of tooth portion 11b and segment coils 12 are assembled into annular core 11 as segment coils 12 are accommodated in these slot portions 11c.

Segment coil 12 is what is called a covered electric wire formed from a rectangular wire to be assembled into annular core 11. This segment coil 12 is constituted of an elemental wire R formed from a conductor shown in FIGS. 7A and 7B and an insulating layer Z which is an insulating substance covering elemental wire R.

As shown in FIG. 4B, this segment coil 12 mainly includes a pair of linear straight portions C accommodated in slot portion 11c and a pair of coil end portions E1 and E2 protruding outward of slot portion 11c and including oblique side portions as forming a mountain shape.

Figure 5A:
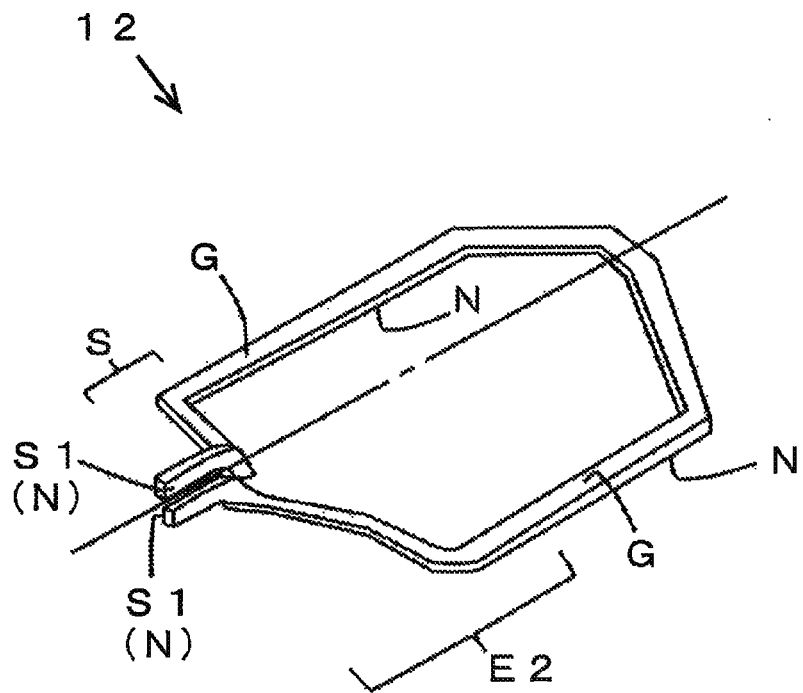
FIG. 5A is a perspective view of the segment coil according to the first embodiment of the present invention.
Figure 5B:
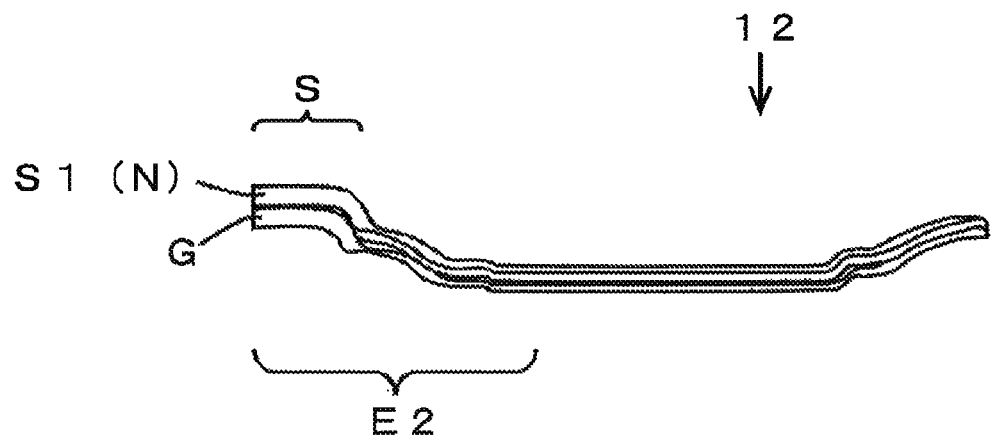
FIG. 5B is a side view of the segment coil according to the first embodiment of the present invention.

As shown in FIG. 4B, a tip end portion for joint S having a joint surface S1 for joining adjacent segment coils 12 in the same phase is provided at a tip end of coil end portion E2. More specifically, as shown in FIGS. 4B, 5A, and 5B, an end portion of coil end portion E2 is twisted (bent) outward in a radial direction of annular core 11. Thus, a pair of tip end portions for joint S arranged at prescribed positions in a circumferential direction of annular core 11 such that joint surface S1 is in parallel to the radial direction of annular core 11 when viewed in an axial direction of annular core 11 is provided at the tip end of coil end portion E2.

Here, a direction perpendicular to an outer-diameter-side coil surface G or an inner-diameter-side coil surface N of straight portion C of segment coil 12 corresponds to the radial direction of the annular core. The "prescribed positions in a circumferential direction of annular core 11" mean any positions in the circumferential direction of annular core 11 at which a plurality of joint surfaces S1 of a plurality of segment coils 12 forming the same phase can be aligned in the radial direction of the annular core when a plurality of segment coils 12 are arranged as aligned in annular core 11 and viewed in the axial direction of annular core 11.

In addition, specifically, as shown in FIGS. 5A and 5B, in segment coil 12 including inner-diameter-side coil surface N and outer-diameter-side coil surface G in the radial direction of annular core 11, the pair of end portions of coil end portion E2 is twisted (bent) by 90 degrees outward in the radial direction of annular core 11 such that inner-diameter-side coil surfaces N are both arranged on an inner side in the circumferential direction of annular core 11 in the pair of tip end portions for joint S (outer-diameter-side coil surfaces G are both arranged on an outer side in the circumferential direction of annular core 11 in the pair of tip end portions for joint S). Thus, the pair of tip end portions for joint S provided to protrude outward in the radial direction of annular core 11 is formed.

Namely, the pair of tip end portions for joint S is formed by twisting (bending) the pair of end portions of coil end portion E2 by 90 degrees in the same direction (outward in the radial direction of annular core 11).

In the present embodiment, as shown in FIG. 5A, inner-diameter-side coil surface N in the pair of tip end portions for joint S is defined as joint surface S1 for joint to another segment coil.

In the present embodiment, as partially shown in FIGS. 4A, 4B, 5A, and 5B, when segment coils 12 are arranged as aligned in slot portions 11c of annular core 11, adjacent tip end portions for joint S (a pair of tip end portions for joint S included in the same segment coil 12) are arranged as displaced between an inner diameter side and an outer diameter side in the radial direction of annular core 11.

Though displacement in this pair of tip end portions for joint S is not illustrated in detail in the present embodiment, a coil in a portion except for tip end portion for joint S on any one side of the coil divided into two by a virtual line (a chain dotted line) shown in FIG. 5A is bent inward or outward in the radial direction of annular core 11, so as to form a difference in level in the radial direction of annular core 11 in the coil divided into two and cause displacement.

In the present embodiment, as shown in FIG. 4B, in segment coil 12, an extension portion H extending from straight portion C to tip end portion for joint S is bent at one or a plurality of location(s) inward in the circumferential direction of annular core 11.

Figure 6:
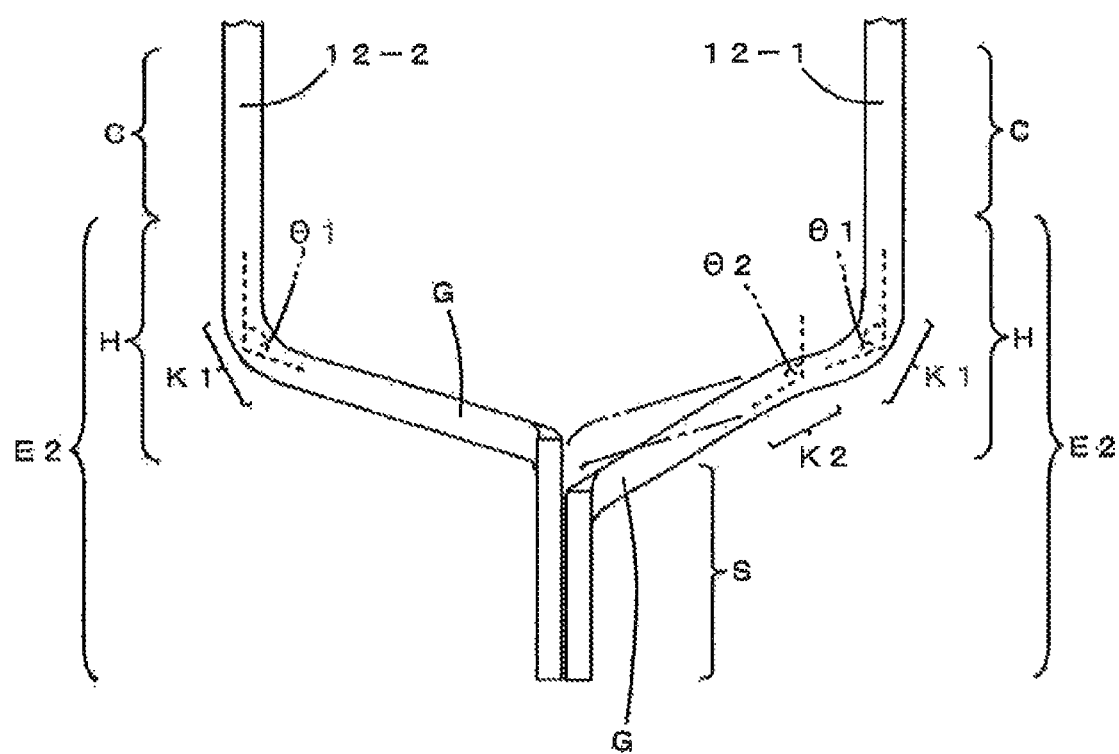
FIG. 6 is a diagram showing a main portion of the segment coil according to the first embodiment of the present invention.

More specifically, as shown in FIG. 6, in an inner-diameter-side coil 12-1 arranged on an inner side in the radial direction of annular core 11, extension portion H is bent inward in the circumferential direction of annular core 11 at two locations of a first bent region K1 and a second bent region K2.

In an outer-diameter-side coil 12-2 arranged on an outer side in the radial direction of annular core 11, extension portion H is bent inward in the circumferential direction of annular core 11 at one location of first bent region K1.

An angle of bending of a coil in first bent region K1 in inner-diameter-side coil 12-1 and in first bent region K1 in outer-diameter-side coil 12-2 is set to the same angle θ1. In addition, in inner-diameter-side coil 12-1, an angle θ2 representing an angle of bending of the coil in second bent region K2 is greater than angle θ1 representing an angle of bending of the coil in first bent region K1.

Desirably, angle θ1 is approximately from 95 degrees to 150 degrees and more preferably approximately from 105 degrees to 125 degrees. When the angle is smaller than 95 degrees, coils interfere with each other in coil end portion E and they cannot be disposed. When the angle exceeds 150 degrees, a dead space between a core end surface and a coil becomes large and a dimension in a direction of length of a motor shaft increases.

Desirably, angle θ2 is approximately from 100 degrees to 160 degrees and more preferably approximately from 110 degrees to 130 degrees. When the angle is smaller than 100 degrees, interference with the other end portion of the same coil is likely. When the angle exceeds 160 degrees, a length of joint at a tip end of a coil is short.

Though not shown, in coil end portion E1 opposite to tip end portion for joint S, in order to avoid contact between segment coils 12 accommodated in adjacent slot portions 11c, a crank portion formed by bending segment coil 12 is formed.

It is noted that an elemental wire normally used as an elemental wire forming a segment coil, for example, of tough pitch copper or oxygen-free copper, can be employed as elemental wire R forming segment coil 12. In the present embodiment, tough pitch copper is employed.

Figure 7A:
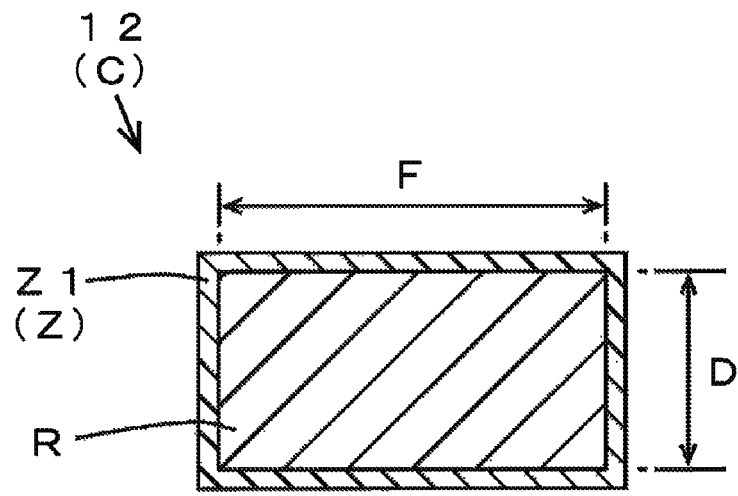
FIG. 7A is a cross-sectional view of a straight portion of the segment coil according to the first embodiment of the present invention.

Desirably, a length D in a direction of a short side of elemental wire R shown in FIG. 7A is approximately from 1.0 mm to 2.0 mm and more preferably approximately from 1.5 mm to 2.0 mm. When a length is shorter than 1.0 mm, a stable dimensional shape is less likely to be obtained in working of a coil or the number of turns increases, which leads to increase in cost. When a length exceeds 2.0 mm, a space for joint decreases.

Desirably, a length F in a longitudinal direction of elemental wire R shown in FIG. 7A is approximately from 2.5 mm to 5.0 mm and more preferably approximately from 3.0 mm to 4.0 mm. When a length is shorter than 2.5 mm, an aspect ratio is low and productivity of a wire rod or an assembly lowers. When a length exceeds 5.0 mm, a width increases, which leads to difficulty in bending of a coil or increase in radial dimension of a joint portion.

Figure 7B:
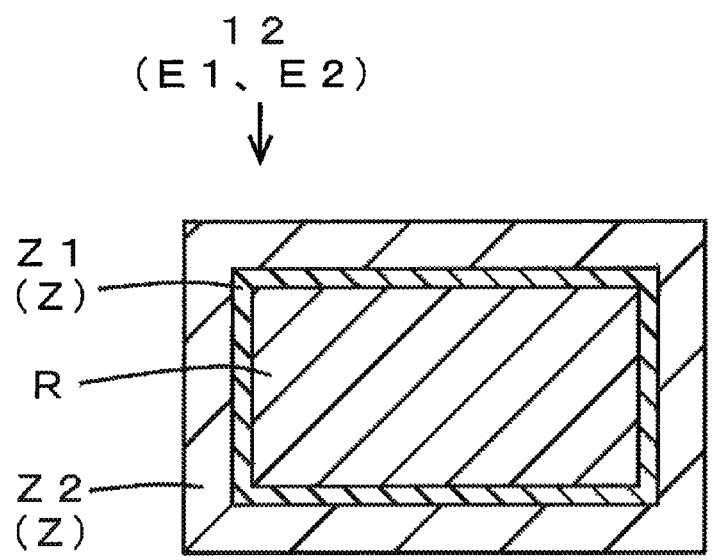
FIG. 7B is a cross-sectional view of a prescribed region of a coil end portion of the segment coil according to the first embodiment of the present invention.

In the present embodiment, as shown in FIGS. 7A and 7B, a construction of an insulating layer Z forming segment coil 12 is different between straight portion C and coil end portions E1 and E2.

More specifically, in straight portion C, as shown in FIG. 7A, insulating layer Z is formed by covering a surface of elemental wire R only with a base insulating layer Z1.

In contrast, in a prescribed region of coil end portion E1 and coil end portion E2, as shown in FIG. 7B, insulating layer Z is formed by covering the surface of elemental wire R with base insulating layer Z1 and further covering a surface of base insulating layer Z1 with an additional insulating layer Z2.

Namely, a thickness of insulating layer Z forming a prescribed region of coil end portion E1 and coil end portion E2 is greater than a thickness of insulating layer Z forming straight portion C.

The "prescribed region of coil end portion E1 and coil end portion E2" here means "a region of coil end portion E1 and coil end portion E2 where adjacent segment coils 12 are proximate to each other and more specifically a region where a distance between adjacent elemental wires R in a state of elemental wire R is approximately from several μm to several hundred μm."

Polyamide imide or polyimide can be employed as a material for base insulating layer Z1. A thickness of base insulating layer Z1 should only comply with a design voltage between coil turns. For example, when a design voltage is 500 V, desirably, a thickness is approximately from 15 μm to 30 μm and more suitably approximately from 15 μm to 25 μm. When a thickness is smaller than 15 μm, probability of deterioration of a film due to partial discharge or occurrence of pin holes during manufacturing increases. When a thickness exceeds 25 μm, lowering in assembly performance due to increase in heat generation or increase in outer diameter caused by lowering in space factor in slot portion 11c is caused. Pulling through a die or electrodeposition can be employed as a formation method. It is noted that base insulating layer Z1 for straight portion C and coil end portions E1 and E2 can integrally be formed in the same step.

A super engineering plastic material represented by polyamide imide or polyimide or a material in which an inorganic filler is mixed in engineering plastic can be used as a material for additional insulating layer Z2. Powder coating, adhesion of a tape, dipping, spray coating, insert injection molding, extrusion, or a heat-shrinkable tube can be employed as a formation method.

Since a peak voltage approximately twice as high as an input voltage is applied as a voltage between motor phases due to influence by inverter surge, for example, when a design voltage is 1000 V, desirably, a thickness of additional insulating layer Z2 is approximately from 40 μm to 200 μm and more preferably approximately from 80 μm to 120 μm. When a thickness is smaller than 40 μm, a film is deteriorated due to partial discharge. When a thickness exceeds 200 μm, a dimension increases due to increase in conductor spacing in coil end portion E1 and coil end portion E2.

Though not illustrated, an oblique side portion is subjected to prescribed bending along the circumferential direction of the stator. A form of prescribed bending along the circumferential direction of the stator is not particularly limited. For example, such bending as bending the oblique side portion at one or two or more location(s) to form substantially a polygonal shape or such bending as varying a center of a radius of curvature or a curvature can be performed.

In the present embodiment, segment coils 12 constructed as such are assembled into annular core 11 as will be described below.

Namely, as shown in FIG. 1 in a simplified manner, among a prescribed number of (four in the present embodiment) segment coils 12 accommodated in the same slot portion 11c, segment coils 12 adjacent in the radial direction of annular core 11 are joined at tip end portions for joint S, so that a first wound coil 12a formed from four segment coils 12 is formed.

In addition, as shown in FIG. 1, the U-phase is formed in such a manner that first wound coil 12a to a fourth wound coil 12d each formed from four segment coils 12 are connected in series at tip end portions for joint S and a pair of first wound coil 12a to fourth wound coil 12d connected in series is connected in parallel. Though not illustrated in detail, the V-phase and the W-phase are formed similarly to the U-phase.

Segment coils 12 forming the U-phase, the V-phase, and the W-phase thus constructed are accommodated in prescribed slot portions 11c as provisionally assembled and thereafter tip end portions for joint S to mutually be connected are joined, so that segment coils 12 are assembled into annular core 11 while they are arranged as aligned.

As above, stator 10 shown in FIGS. 3A and 3B and partially in FIGS. 4A and 4B is formed. Motor 1 is formed by combining this stator 10 with a not-shown rotor.

As shown in FIG. 1, one ends of segment coils 12 (first wound coils 12a in the present embodiment) forming respective phases of the U-phase, the V-phase, and the W-phase serve as input terminals 12U, 12V, and 12W connected to high-voltage cable 6, and the other ends (fourth wound coils 12d in the present embodiment) serve as neutral points 12UN, 12VN, and 12WN, respectively.

It is noted that welding such as resistance welding or solid-phase welding such as ultrasonic welding and cold welding can be employed as a method of joining tip end portions for joint S. In the present embodiment, tip end portions for joint S to mutually be joined are joined through ultrasonic welding representing solid-phase welding.

Segment coil 12, stator 10 including segment coils 12, and motor 1 including stator 10 according to the embodiment of the present invention constructed as such achieve the following effect.

Figure 8:
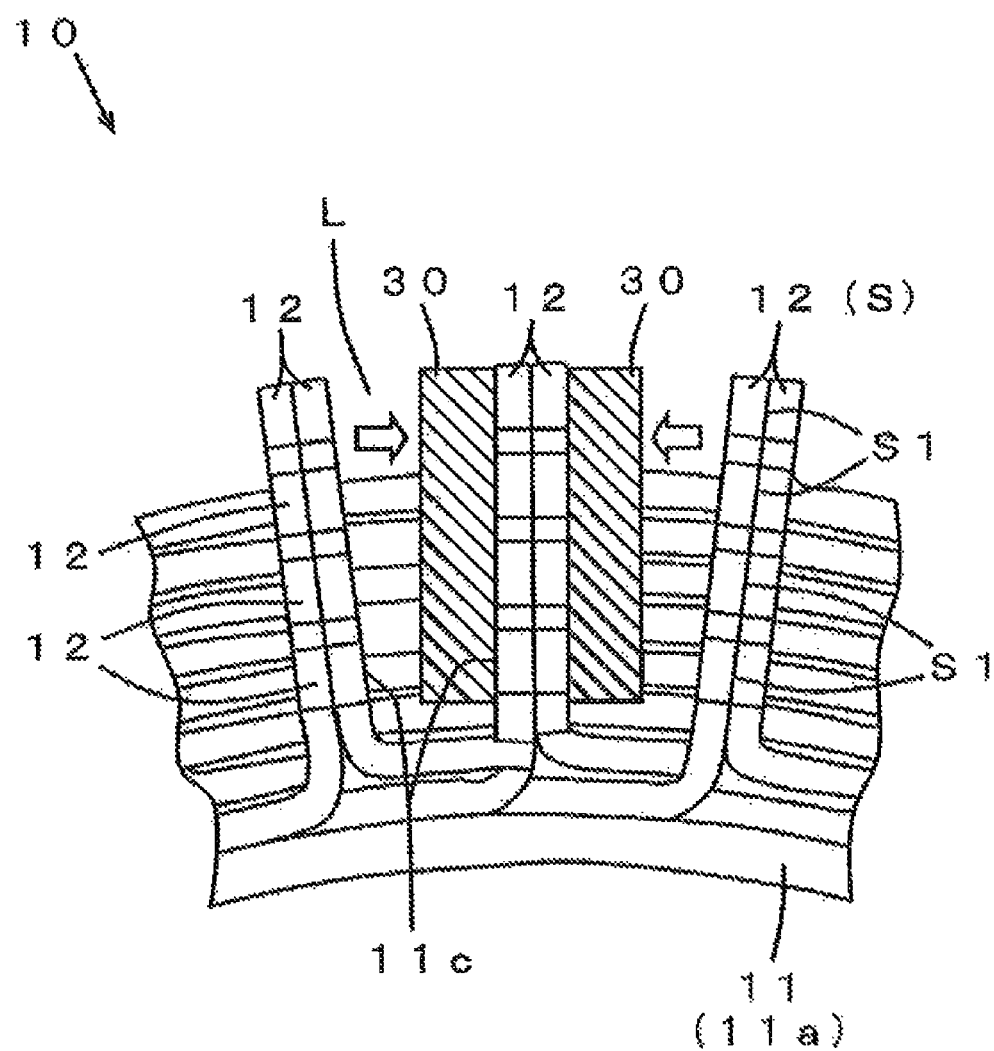
FIG. 8 is a diagram schematically showing a state that tip end portions for joint are joined after the segment coils according to the first embodiment of the present invention are assembled into the annular core.

Tip end portion for joint S is constructed such that joint surface S1 thereof is in parallel to the radial direction of annular core 11 when viewed in the axial direction of annular core 11, by twisting an end portion of coil end portion E2. Thus, as shown in FIG. 8, when a plurality of segment coils 12 are arranged as aligned in annular core 1, a direction of pressurization of tip end portion for joint S can be set to the circumferential direction of annular core 11 (a direction shown with a hollow arrow in FIG. 8). Therefore, a space L (a gap) formed between adjacent slot portions 11c can effectively be made use of for joint of tip end portions for joint S.

Therefore, a sufficient space can be secured in the direction of pressurization of tip end portion for joint S and operability in the step of joining tip end portions for joint S can be improved. More specifically, bringing or taking a jig for joint 30 (in the present embodiment, an ultrasonic jig) into or out of space L formed between adjacent slot portions 11c can be facilitated or accuracy in holding tip end portions for joint S to mutually be joined can be improved.

Therefore, adjacent segment coils 12 can efficiently be joined to each other.

By setting joint surface S1 of tip end portion for joint S to be in parallel to the radial direction of annular core 11, when a plurality of segment coils 12 are arranged as aligned in annular core 11, space L (gap) formed between adjacent slot portions 11 can effectively be increased and stator 10 and motor 1 can have a good heat dissipation property.

When segment coils 12 are arranged as aligned in slot portions 11 of annular core 11, adjacent tip end portions for joint S (a pair of tip end portions for joint S included in the same segment coil 12) are arranged as displaced between the inner diameter side and the outer diameter side in the radial direction of annular core 11. Thus, as shown in FIG. 8, simply by arranging a plurality of segment coils 12 as aligned in annular core 11, joint surfaces S1 of tip end portions for joint S to mutually be joined, of a plurality of segment coils 12 arranged in the same slot portion 11c, can be arranged as opposed to each other.

In addition, by setting joint surface S1 to be in parallel to the radial direction of annular core 11, as shown in FIG. 8, joint surfaces S1 of a plurality of sets of tip end portions for joint S to mutually be joined can be arranged in a line in the radial direction of annular core 11.

Additionally, as described already, space L (gap) formed between adjacent slot portions 11c can effectively be made use of for joint of tip end portions for joint S. Therefore, as shown in FIG. 8, a plurality of sets of tip end portions for joint S to mutually be joined can simultaneously (together) be pinched by jig for joint 30 and joint of the plurality of sets of tip end portions for joint S can simultaneously be achieved. Namely, multi-point simultaneous joint of the plurality of sets of tip end portions for joint S can be achieved.

Therefore, operability in the step of joining tip end portions for joint S can further effectively be improved.

Therefore, further efficient joint of adjacent segment coils 12 can be realized and stator 10 and motor 1 can be high in manufacturing efficiency.

In inner-diameter-side coil 12-1, extension portion H is bent inward in the circumferential direction of annular core 11 at two locations of first bent region K1 and second bent region K2, and in outer-diameter-side coil 12-2, extension portion H is bent inward in the circumferential direction of annular core 11 at one location of first bent region K1. In addition, an angle of bending of the coil in first bent region K1 in inner-diameter-side coil 12-1 and an angle of bending of the coil in first bent region K1 in outer-diameter-side coil 12-2 are both set to angle θ1, and in inner-diameter-side coil 12-1, angle θ2 is set to be greater than angle θ1. Thus, as shown in FIG. 6, tip end portion for joint S of inner-diameter-side coil 12-1 and tip end portion for joint S of outer-diameter-side coil 12-2 are displaced from each other in the axial direction of annular core 11.

More specifically, in inner-diameter-side coil 12-1 and outer-diameter-side coil 12-2, the coil (extension portion H) is bent at the same angle θ1 inward in the circumferential direction of annular core 11. Therefore, essentially, as shown with a virtual line (a chain dotted line) in FIG. 6, tip end portion for joint S of inner-diameter-side coil 12-1 and tip end portion for joint S of outer-diameter-side coil 12-2 are not displaced from each other in the axial direction of annular core 11. By further bending inner-diameter-side coil 12-1 at angle θ2, as shown in FIG. 6, tip end portion for joint S of inner-diameter-side coil 12-1 can be arranged below tip end portion for joint S of outer-diameter-side coil 12-2 in the axial direction of annular core 11.

Figure 9A:
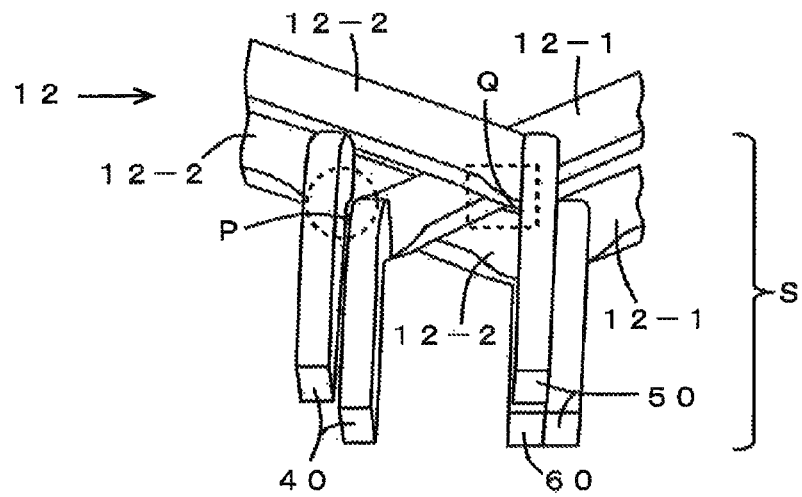
FIG. 9A is a diagram showing the segment coils according to the first embodiment of the present invention and a diagram schematically showing segment coils arranged in adjacent slot portions in a state that the segment coils are assembled into the annular core.

Therefore, when a plurality of segment coils 12 are arranged as aligned in annular core 11, as shown in FIG. 9A in a simplified manner, initially, a space P (gap) can be formed in a pair of tip end portions for joint S (a portion shown with a dashed circle in FIG. 9A) in the same segment coil 12. Therefore, contact in the pair of tip end portions for joint S can be prevented.

Additionally, a space Q (gap) can be formed between segment coils 12 arranged in adjacent slot portions 11c (a portion shown with a dashed quadrangle in FIG. 9A). Therefore, contact between adjacent segment coils 12 can be prevented. More specifically, as shown in FIG. 9A, while a first segment coil 40, a second segment coil 50, and a third segment coil 60 (inner-diameter-side coil 12-1 not shown) are arranged, contact between inner-diameter-side coil 12-1 of first segment coil 40 and outer-diameter-side coil 12-2 of third segment coil 60 can effectively be prevented.

Figure 9B:
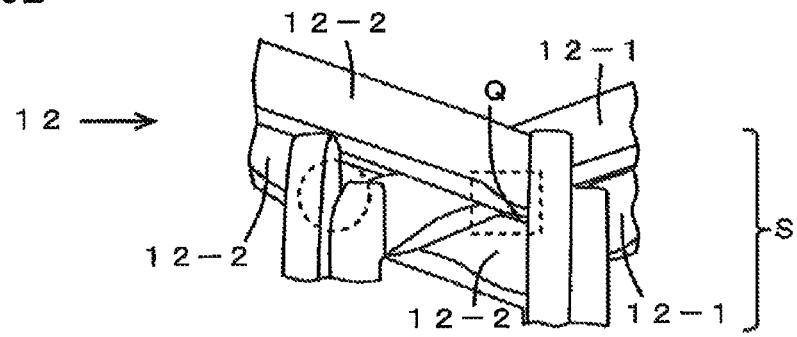
FIG. 9B is a diagram showing segment coils in a first comparative example.
Figure 9C:
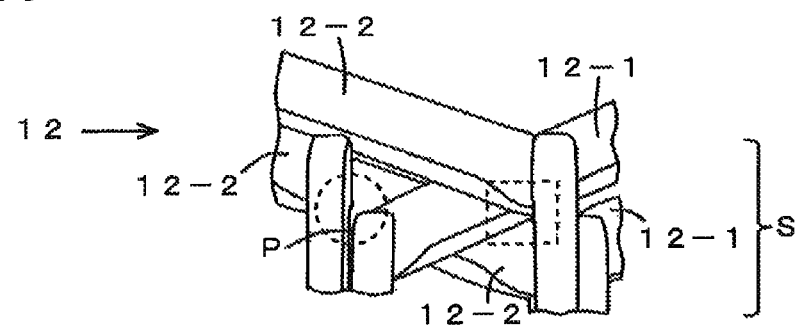
FIG. 9C is a diagram showing segment coils in a second comparative example.

It is noted that FIGS. 9A, 9B, and 9C show that second segment coil 50 and third segment coil 60 are arranged in the same slot portion (not shown) and inner-diameter-side coil 12-1 of second segment coil 50 and outer-diameter-side coil 12-2 of third segment coil 60 are ultrasonically mutually bonded. First segment coil 40 is assumed to show segment coil 12 which is arranged in slot portion 11c next to slot portion 11c where second segment coil 50 and third segment coil 60 are arranged.

Namely, as in a first comparative example shown in FIG. 9B, when angle θ1 (shown in FIG. 6) is smaller than in the present embodiment in inner-diameter-side coil 12-1, space Q can be formed between segment coils 12 (a portion shown with a dashed quadrangle in FIG. 9B) arranged in adjacent slot portions 11c, whereas space P cannot be formed in the pair of tip end portions for joint S (a portion shown with a dashed circle in FIG. 9B) in the same segment coil 12.

Therefore, paired tip end portions for joint S come in contact with each other.

As in a second comparative example shown in FIG. 9C, when angle θ1 (shown in FIG. 6) is greater than in the present embodiment in inner-diameter-side coil 12-1, space P can be formed in the pair of tip end portions for joint S (a portion shown with a dashed circle in FIG. 9C) in the same segment coil 12, whereas space Q cannot be formed between segment coils 12 (a portion shown with a dashed quadrangle in FIG. 9C) arranged in adjacent slot portions 11c.

Therefore, segment coils 12 arranged in adjacent slot portions 11c come in contact with each other.

Therefore, according to the present embodiment, space P and space Q can simultaneously be formed in the pair of tip end portions for joint S in the same segment coil 12 and between segment coils 12 arranged in adjacent slot portions 11c, respectively.

Namely, contact of coil between segment coils 12 arranged in adjacent slot portions 111c can be avoided owing to angle θ1, and contact of coil in the pair of tip end portions for joint S in the same segment coil 12 can be avoided owing to angle θ2.

Therefore, when a plurality of segment coils 12 are arranged as aligned in annular core 11, contact between segment coils 12 arranged in adjacent slot portions 11c and in the pair of tip end portions for joint S in the same segment coil 12 can be prevented. In addition, by forming a crank portion in coil end portion E opposite to tip end portion for joint S, contact between segment coils 12 accommodated in adjacent slot portions 11c can also be avoided in coil end portion E opposite to tip end portion for joint S.

Therefore, stator 10 and motor 1 can be high in electrical connection reliability.

By joining tip end portions for joint S to mutually be joined through ultrasonic welding representing solid-phase welding, a time period for operation for the joint step can be shortened and stator 10 and motor 1 can be higher in manufacturing efficiency. By employing solid-phase welding, influence by heat is less, and a conductor or a film material low in heat resistance and inexpensive can be employed.

By employing tough pitch copper for elemental wire R forming segment coil 12, segment coil 12 can be excellent in electrical conductivity and thermal conductivity as well as good in workability. Segment coil 12, stator 10, and motor 1 can achieve reduction in manufacturing cost.

In straight portion C, only base insulating layer Z1 is formed on the surface of elemental wire R, and when a design voltage is 500 V, insulating layer Z1 has a thickness approximately from 15 µm to 30 µm. Thus, segment coil 12 can achieve an effectively improved space factor in slot portion 11c. Therefore, stator 10 and motor 1 can be high in efficiency.

In a prescribed region of coil end portions E1 and E2, when a design voltage is 1000 V, base insulating layer Z1 having a thickness approximately from 15 µm to 30 µm is formed on the surface of elemental wire R and additional insulating layer Z2 having a thickness approximately from 40 µm to 200 µm is further formed on the surface of base insulating layer Z1. Thus, segment coil 12 can achieve effective prevention of deterioration in insulating layer Z in a region where adjacent segment coils 12 are proximate to each other, more specifically, in a region where corona discharge is likely and deterioration of insulating layer Z is likely due to a distance between adjacent elemental wires R being set to approximately several µm to several hundred µm. Therefore, stator 10 and motor 1 can maintain good insulation.

Namely, a thickness of insulating layer Z in coil 12 can be variable. More specifically, in straight portion C where improvement in space factor is desired, a thickness of insulating layer Z can be decreased, while in a region in coil end portions E1 and E2 where prevention of deterioration of insulation involved with corona discharge is desired, a thickness of insulating layer Z can be increased. With such a construction, as compared with a case that insulating layer Z is integrally formed on the surface of elemental wire R in accordance with a thickness in a prescribed region in coil end portion E of which thickness should be large, manufacturing cost can be suppressed.

Therefore, segment coil 12, stator 10, and motor 1 can simultaneously achieve improvement in space factor in slot portion 11c and prevention of deterioration of insulating layer Z in particular in coil end portion E as well as reduction in manufacturing cost.

As shown in FIGS. 11A to 13, conventional segment coils 22 arranged as aligned in slot portions 21c of an annular core 21 have generally been constructed such that joint surface SI1 of tip end portion for joint S is orthogonal to the radial direction of annular core 21.

Figure 13:
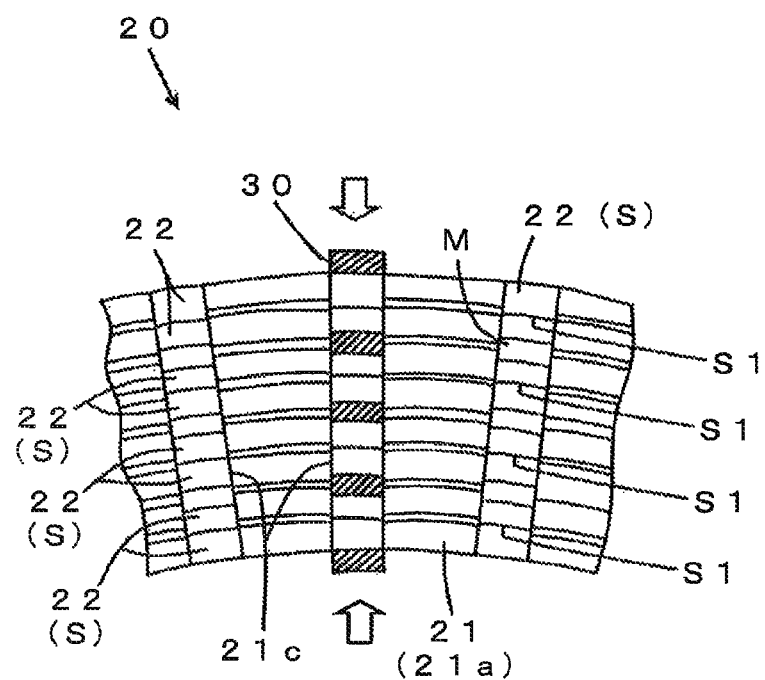
FIG. 13 is a diagram schematically showing a state that tip end portions for joint are joined after the conventional segment coils are assembled into the annular core.

Therefore, in a stator 20 including such conventional segment coils 22, as shown in FIG. 13, when a plurality of segment coils 22 are arranged as aligned in annular core 21, a direction of pressurization of joint surfaces S1 to mutually be joined is set to the radial direction (a direction shown with a hollow arrow in FIG. 13) of annular core 21.

Therefore, since a space M (gap) formed in the radial direction of annular core 21 is narrow between adjacent tip end portions for joint S, a sufficient space could not be secured in the direction of pressurization of tip end portions for joint S and operability in the step of joining tip end portions for joint S has been poor.

More specifically, as shown in FIG. 13, a method of joining tip end portions for joint S is restricted to what is called single-point joint, in which a pair of tip end portions for joint S to mutually be joined is fixed for each set with the use of jig for joint 30 on an inner side and on an outer side in the radial direction of annular core 21 and joint is carried out for each set. Thus, a joint step has been burdensome and operability has been poor. Since space M formed between tip end portions for joint S adjacent in the radial direction of annular core 21 is narrow, accuracy in positioning of jig for joint 30 is strict and operation efficiency has been poor.

Figure 12:
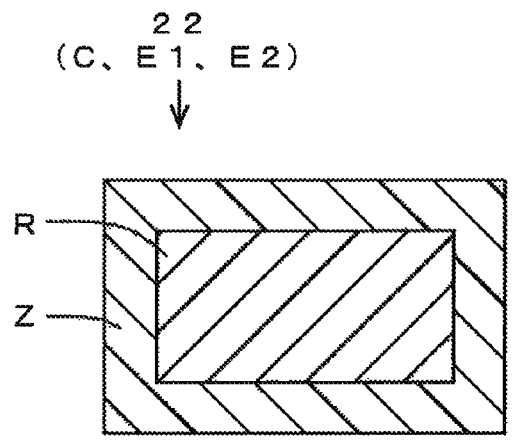
FIG. 12 is a cross-sectional view of the conventional segment coil.

As shown in FIG. 12, generally, such a conventional segment coil 22 has had no variation in thickness as a result of formation of insulating layer Z having a uniform thickness over the entire surface of elemental wire R in straight portion C and coil end portion E.

Namely, in order to prevent deterioration of insulating layer Z involved with corona discharge, insulating layer Z uniform in thickness has integrally been formed on the surface of elemental wire R in accordance with a thickness of coil end portion E in which a thickness of insulating layer Z should be large.

Therefore, as a thickness of insulating layer Z is large also in straight portion C where a thickness of insulating layer Z does not have to be large, a space factor in a slot portion could not be improved and manufacturing cost could not be reduced.

Therefore, according to segment coil 12 and stator 10 in the embodiment of the present invention, operability in the step of joining tip end portions for joint S can be improved and multi-point simultaneous joint of a plurality of sets of tip end portions for joint S can be achieved.

Segment coil 12 and stator 10 as well as motor 1 including the same can simultaneously achieve improvement in space factor in slot portion 11c and prevention of deterioration of insulating layer Z in particular in coil end portions E1 and E2 as well as effective suppression of manufacturing cost.

A method of manufacturing segment coil 12, stator 10 including segment coils 12, and motor 1 including stator 10 according to the embodiment of the present invention will now be described with reference to FIGS. 10A to 10D.

Figure 10A:
FIG. 10A is a diagram showing in a simplified manner, a step of preparing an elemental wire formed from a rectangular wire in a state that no insulating layer is formed in a method of manufacturing a segment coil according to the first embodiment of the present invention.

Initially, referring to FIG. 10A, elemental wire R formed from a rectangular wire in a state that no insulating layer is formed is prepared. It is noted that elemental wire R made of tough pitch copper is employed in the present embodiment.

Figure 10B:
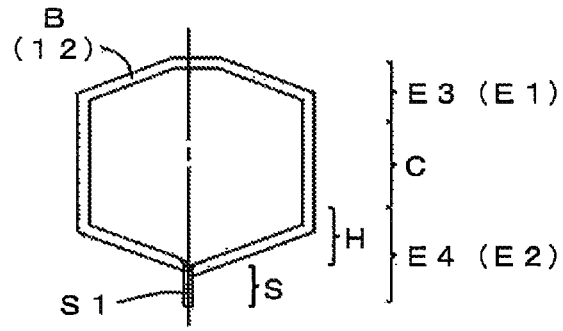
FIG. 10B is a diagram showing in a simplified manner, a coil element forming step of working an elemental wire to a coil element forming a shape of a segment coil in the method of manufacturing a segment coil according to the first embodiment of the present invention.

Then, referring to FIG. 10B, by bending elemental wire R formed from a rectangular wire substantially in a U shape with a not-shown bending jig in a coil element forming step, elemental wire R is worked to coil element B which forms a shape of what is called a segment coil.

Here, on any one side of left and right of a coil divided into two by a virtual line (a chain dotted line) shown in FIG. 10B, a coil in a portion except for tip end portion for joint S is bent inward or outward in the radial direction of annular core 11 (not shown), so as to form a difference in level in the coil divided into two.

Thus, when segment coils 12 are arranged as aligned in slot portions 11c of annular core 11, adjacent tip end portions for joint S (a pair of tip end portions for joint S included in the same segment coil 12) can be arranged as displaced between the inner diameter side and the outer diameter side in the radial direction of annular core 11.

As shown in FIG. 6, in inner-diameter-side coil 12-1, extension portion H is bent inward in the circumferential direction of annular core 11 at two locations of first bent region K1 and second bent region K2, and in outer-diameter-side coil 12-2, extension portion H is bent inward in the circumferential direction of annular core 11 at one location of first bent region K1.

Desirably, angle of bending θ1 in first bent region K1 is approximately from 95 degrees to 150 degrees and more preferably approximately from 105 degrees to 125 degrees, and angle of bending θ2 in second bent region K2 is approximately from 100 degrees to 160 degrees and more preferably approximately from 110 degrees to 130 degrees.

A not-shown bending jig is used to form a crank portion (not shown) in coil element B.

In addition, in this coil element forming step, a pair of end portions of a coil end portion E4 of coil element B is twisted (bent) by 90 degrees outward in the radial direction of annular core 11 in a tip-end-portion-for-joint forming step. Thus, a pair of tip end portions for joint S arranged at prescribed positions in the circumferential direction of annular core 11 such that joint surface S1 for joint to another segment coil is in parallel to the radial direction of annular core 11 when viewed in the axial direction of annular core 11 is formed at a tip end of coil end portion E4.

Then, though not shown, in a base insulating layer forming step in an insulating layer forming step, in coil element B, the entire surface except for tip end portion for joint S is covered with an insulating substance to a uniform thickness, so as to integrally form base insulating layer Z1 having a uniform thickness on the surface of coil element B. Here, when a design voltage is 500 V, desirably, base insulating layer Z1 has a thickness approximately from 15 µm to 30 µm and more preferably approximately from 15 µm to 25 µm.

Then, though not shown, in an additional insulating layer forming step in the insulating layer forming step, additional insulating layer Z2 is formed by covering a prescribed region of coil end portions E3 and E4 of coil element B with an insulating substance the same as that for base insulating layer Z1 to a uniform thickness.

Here, when a design voltage is 1000 V, desirably, additional insulating layer Z2 has a thickness approximately from 40 µm to 200 µm and more preferably approximately from 80 µm to 120 µm.

Through the steps above, insulating layer Z is formed on the surface of coil element B. Segment coil 12 according to the embodiment of the present invention is thus formed.

Figure 10C:
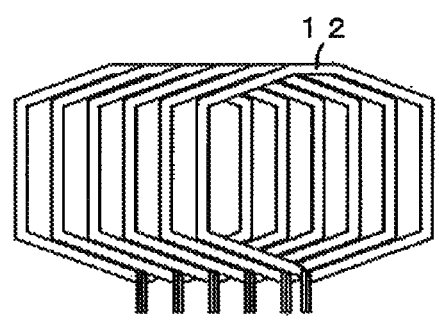
FIG. 10C is a diagram showing in a simplified manner, a step of provisionally assembling segment coils forming a U-phase, a V-phase, and a W-phase in the method of manufacturing a segment coil according to the first embodiment of the present invention.

Then, as shown in FIG. 10C in a simplified manner, segment coils 12 forming the U-phase, the V-phase, and the W-phase are provisionally assembled.

Figure 10D:
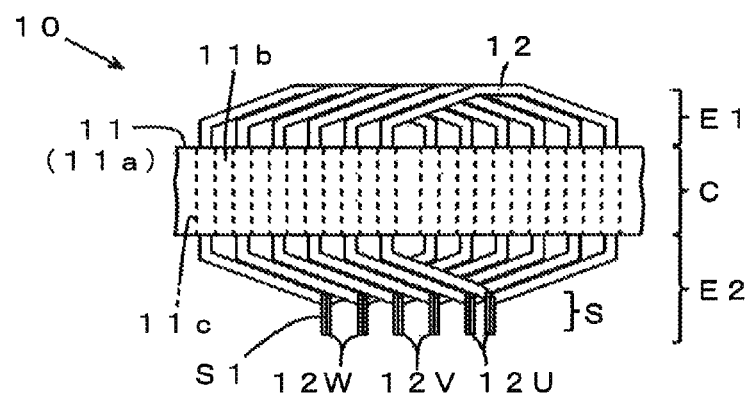
FIG. 10D is a diagram showing in a simplified manner, a step of assembling provisionally assembled segment coils into slot portions of the annular core in the method of manufacturing a segment coil according to the first embodiment of the present invention.
Figure 11A:
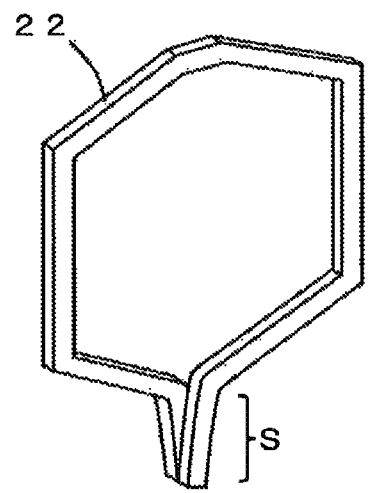
FIG. 11A is a perspective view of a conventional segment coil.
Figure 11B:
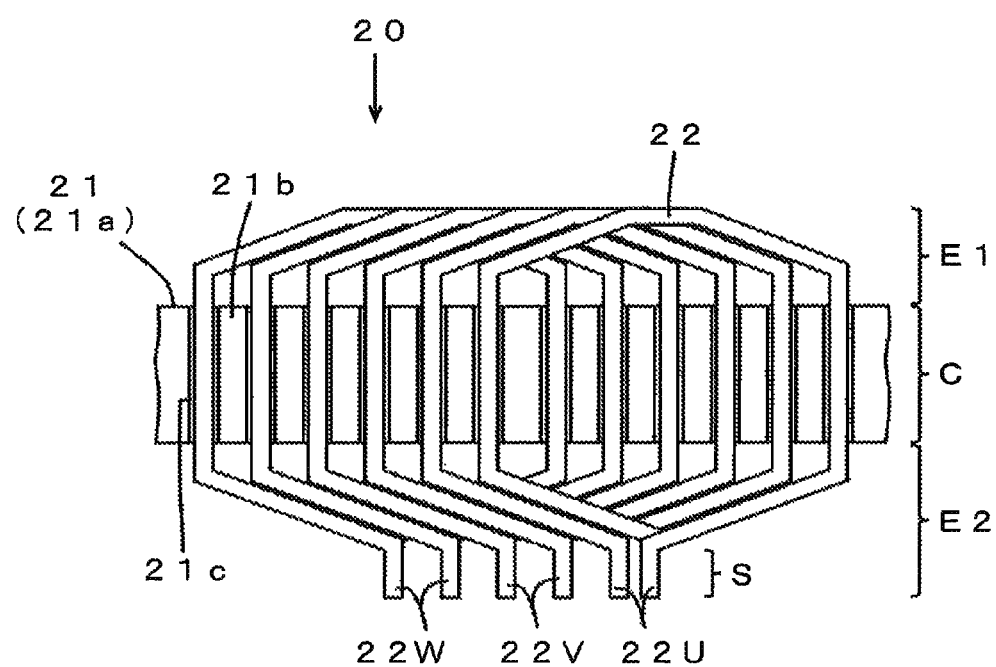
FIG. 11B is a diagram showing the conventional segment coils and a diagram showing in a simplified manner, a main portion when the segment coils assembled into an annular core are viewed from a rotor side.

Then, as shown in FIG. 10D in a simplified manner, segment coils 12 in a provisionally assembled state are assembled into slot portions 11e of annular core 11.

Then, tip end portions for joint S of segment coils 12 forming the U-phase, the V-phase, and the W-phase, respectively and assembled in the same slot portion 11c are joined through ultrasonic welding.

More specifically, as shown in FIG. 8, a plurality of sets of tip end portions for joint S to mutually be joined are ultrasonically bonded while they are simultaneously pinched by jig for joint 30.

Thus, first wound coil 12a to fourth wound coil 12d in respective phases are formed.

Then, though not shown, by connecting in series first wound coil 12a to fourth wound coil 12d in each phase with a jumper line, a pair of first wound coil 12a to fourth wound coil 12d is connected in parallel.

Through the steps above, stator 10 according to the embodiment of the present invention is formed.

Motor 1 is formed by combining stator 10 thus formed with a not-shown rotor.

The method of manufacturing segment coil 12, stator 10 including segment coils 12, and motor 1 including stator 10 according to the embodiment of the present invention as such achieve the following effect.

Tip end portion for joint S is constructed such that joint surface S1 is in parallel to the radial direction of annular core 11, and arranged at a prescribed position in the circumferential direction of annular core 11 when viewed in the axial direction of annular core 11. Thus, as shown in FIG. 8, when a plurality of segment coils 12 are arranged as aligned in annular core 11, a direction of pressurization of tip end portion for joint S can be set to the circumferential direction of annular core 11 (the direction shown with the hollow arrow in FIG. 8). Therefore, space L (gap) formed between adjacent slot portions 11c can effectively be made use of for joint of tip end portions for joint S.

Therefore, a sufficient space can be secured in the direction of pressurization of tip end portion for joint S and operability in the step of joining tip end portions for joint S can be improved. More specifically, bringing or taking jig for joint 30 into or out of space L formed between adjacent slot portions 11c can be facilitated or accuracy in holding tip end portions for joint S to mutually be joined can be improved.

Therefore, segment coil 12 allowing efficient joint of adjacent segment coils 12 can be manufactured. Therefore, a method of manufacturing stator 10 and motor 1 can be high in manufacturing efficiency.

By setting joint surface S1 of tip end portion for joint S to be in parallel to the radial direction of annular core 11, when a plurality of segment coils 12 are arranged as aligned in annular core 11, segment coil 12 allowing effective increase in space L (gap) formed between adjacent slot portions 11c can be manufactured. Therefore, stator 10 and motor 1 having a good heat dissipation property can be manufactured.

When tip end portion for joint S is formed to be arranged at a prescribed position in the circumferential direction of annular core 11 and segment coils 12 are arranged as aligned in slot portions 11c of annular core 11, adjacent tip end portions for joint S (a pair of tip end portions for joint S included in the same segment coil 12) are arranged as displaced between the inner diameter side and the outer diameter side in the radial direction of annular core 11. Thus, as shown in FIG. 8, simply by arranging a plurality of segment coils 12 as aligned in annular core 11, joint surfaces S1 of tip end portions for joint S to mutually be joined, of a plurality of segment coils 12 arranged in the same slot portion 11c, can be arranged as opposed.

In addition, by setting joint surface S1 to be in parallel to the radial direction of annular core 11, as shown in FIG. 8, joint surfaces S1 of a plurality of sets of tip end portions for joint S to mutually be joined can be arranged in a line in the radial direction of annular core 11. Additionally, as described already, space L (gap) formed between adjacent slot portions 11c can effectively be made use of for joint of tip end portions for joint S. Therefore, as shown in FIG. 8, a plurality of sets of tip end portions for joint S to mutually be joined can simultaneously (together) be pinched by jig for joint 30 (in the present embodiment, an ultrasonic jig) and joint of the plurality of sets of tip end portions for joint S can simultaneously be achieved. Namely, multi-point simultaneous joint of the plurality of sets of tip end portions for joint S can be achieved.

Therefore, operability in the step of joining tip end portions for joint S can further effectively be improved.

Therefore, segment coil 12 allowing further efficient joint of adjacent segment coils 12 can be manufactured. Therefore, a method of manufacturing stator 10 and motor 1 high in manufacturing efficiency can be obtained.

In inner-diameter-side coil 12-1, extension portion H is bent inward in the circumferential direction of annular core 11 at two locations of first bent region K1 and second bent region K2, and in outer-diameter-side coil 12-2, extension portion H is bent inward in the circumferential direction of annular core 11 at one location of first bent region K1. In addition, an angle of bending of the coil in first bent region K1 in inner-diameter-side coil 12-1 and an angle of bending of the coil in first bent region K1 in outer-diameter-side coil 12-2 are both set to angle θ1, and in inner-diameter-side coil 12-1, angle θ2 is set to be greater than angle θ1. Thus, as shown in FIG. 6, tip end portion for joint S of inner-diameter-side coil 12-1 and tip end portion for joint S of outer-diameter-side coil 12-2 are displaced from each other in the axial direction of annular core 11.

Therefore, as described already, when a plurality of segment coils 12 are arranged as aligned in annular core 11, contact of coil between segment coils 12 arranged in adjacent slot portions 11c and in the pair of tip end portions for joint S in the same segment coil 12 can be prevented. In addition, by forming a crank portion in coil end portion E opposite to tip end portion for joint S, contact between segment coils 12 accommodated in adjacent slot portions 11c can also be avoided in coil end portion E opposite to tip end portion for joint S.

Therefore, segment coil 12 capable of realizing stator 10 and motor 1 high in electrical connection reliability can be manufactured.

By joining tip end portions for joint S to mutually be joined through ultrasonic welding representing solid-phase welding, a time period for operation for the joint step can be shortened and a method of manufacturing stator 10 and motor 1 higher in manufacturing efficiency can be obtained.

By employing tough pitch copper for elemental wire R forming segment coil 12, segment coil 12 can be excellent in electrical conductivity and thermal conductivity as well as good in workability. Therefore, a method of manufacturing stator 10 and motor 1 capable of manufacturing stator 10 and motor 1 high in electrical connection reliability and allowing higher efficiency in a manufacturing process can be obtained. A method of manufacturing segment coil 12, stator 10, and motor 1 capable of achieving reduction in manufacturing cost can be obtained.

In straight portion C, only base insulating layer Z1 is formed on the surface of elemental wire R, and when a design voltage is 500 V, insulating layer Z1 has a thickness approximately from 15 μm to 30 μm. Thus, segment coil 12 capable of achieving effective improvement in spacing factor in slot portion 11c can be manufactured. Therefore, stator 10 and motor 1 high in efficiency can be manufactured.

In addition, in a prescribed region of coil end portions E1 and E2, when a design voltage is 1000 V, base insulating layer Z1 having a thickness approximately from 15 μm to 30 μm is formed on the surface of elemental wire R and additional insulating layer Z2 having a thickness approximately from 40 μm to 200 μm is further formed on the surface of base insulating layer Z1. Thus, segment coil 12 capable of achieving effective prevention of deterioration in insulating layer Z in a region where adjacent segment coils 12 are proximate to each other, more specifically, in a region where corona discharge is likely and deterioration of insulating layer Z is likely due to a distance between adjacent elemental wires R being set to approximately several μm to several hundred μm can be manufactured. Therefore, stator 10 and motor 1 capable of maintaining good insulation can be manufactured.

Namely, a thickness of insulating layer Z in segment coil 12 can be variable. More specifically, in straight portion C where improvement in space factor is desired, a thickness of insulating layer Z can be decreased, while in a region in coil end portion E where prevention of deterioration of insulation involved with corona discharge is desired, a thickness of insulating layer Z can be increased. With such a construction, the method of manufacturing segment coil 12, stator 10, and motor 1 including the same can achieve effectively suppressed manufacturing cost as compared with a case that insulating layer Z is integrally formed on the surface of elemental wire R in accordance with a thickness in a prescribed region in coil end portion E where a thickness should be large.

Therefore, the method of manufacturing segment coil 12, stator 10, and motor 1 can simultaneously achieve improvement in space factor in slot portion 11c and prevention of deterioration of insulating layer Z in particular in coil end portion E as well as effectively suppressed manufacturing cost.

Though a difference in level is formed between the left and the right of a coil divided into two by the virtual line (the chain dotted line) shown in FIG. 5A by bending the coil in a portion except for tip end portion for joint S inward or outward in the radial direction of annular core 11 to thereby cause displacement in the pair of tip end portions for joint S in the radial direction of annular core 11 in the present embodiment, a method of causing displacement in the pair of tip end portions for joint S in the radial direction of annular core 11 is not necessarily limited as such.

For example, displacement may be caused in the pair of tip end portions for joint S in the radial direction of annular core 11 by differing a direction of twist (a direction of bending) of the pair of tip end portions for joint S without forming a difference in level in the radial direction of annular core 11 between the left and the right of the coil divided into two by the virtual line (the chain dotted line) shown in FIG. 5A. More specifically, displacement in the radial direction of annular core 11 may be caused in the pair of tip end portions for joint S by twisting (bending) an end portion of coil end portion E4 by 90 degrees such that, in any one of paired tip end portions for joint S, inner-diameter-side coil surface N is arranged on the inner side in the circumferential direction of annular core 11, and in the other remaining one, inner-diameter-side coil surface N is arranged on the outer side in the circumferential direction of annular core 11. Namely, displacement in the radial direction of annular core 11 may be caused in the pair of tip end portions for joint S by twisting (bending) paired end portions in coil end portion E4 by 90 degrees in different directions in the radial direction of annular core 11.

The number of times of bending, a position of bending, and an angle of bending inward in the circumferential direction of annular core 11 in inner-diameter-side coil 12-1 and outer-diameter-side coil 12-2 are not limited to those in the present embodiment either and can be changed as appropriate so long as contact of coil in the pair of tip end portions for joint S in the same segment coil 12 and between coil end portions of segment coils 12 arranged in adjacent slot portions 11c in a case that a plurality of segment coils 12 are arranged as aligned in annular core 11 can be prevented.

Though tip end portions for joint S to mutually be joined are joined through ultrasonic welding representing solid-phase welding in the present embodiment, limitation thereto is not necessarily intended.

For example, other solid-phase welding such as cold welding or welding such as resistance welding can be employed for joint of tip end portions for joint S to mutually be joined.

Though base insulating layer Z1 and additional insulating layer Z2 are formed of the same insulating substance in the present embodiment, limitation thereto is not necessarily intended and base insulating layer Z1 and additional insulating layer Z2 may be formed of different insulating substances. For example, base insulating layer Z1 can be formed of an insulating substance more inexpensive than additional insulating layer Z2. Thus, segment coil 12 can achieve further suppressed manufacturing cost.

In the present embodiment, as shown in FIG. 7B, though additional insulating layer Z2 is provided around the entire perimeter of segment coil 12 in a prescribed region of segment coil 12, limitation thereto is not necessarily intended and additional insulating layer Z2 may be provided only in a part of the outer perimeter of segment coil 12 so long as additional insulating layer Z2 is provided in a region of a pair of coil end portions E1 and E2 where adjacent coils 12 are proximate to each other, more specifically, a portion where a distance between adjacent elemental wires R in a state of elemental wire R is approximately from several μm to several hundred μm.

It is noted that, in a pair of coil end portions E1 and E2, desirably, additional insulating layer Z2 is provided in an oblique side portion except for a portion in the vicinity of the peak portion of the mountain shape and the portions in the vicinity of the opposing mountain-foot portions and/or in a straight portion extending from the slot.

It is noted that the "mountain-foot portion" here means a bent portion representing transition from the straight portion to the oblique side portion which forms coil end portion E1, E2

Namely, in order to prevent crack or peel-off in additional insulating layer Z2, additional insulating layer Z2 is preferably provided in a prescribed region of a portion which has not been bent or a portion bent at a large radius of curvature.

For example, in a case that coil end portions E1 and E2 are formed in a mountain shape, the portion in the vicinity of the peak portion of the mountain shape and the portion in the vicinity of the mountain-foot portion of the mountain shape representing transition from the oblique side of the mountain shape to straight portions C accommodated in slot portion 11c are bent at a radius of curvature 0.5 to 3 times as large as that for a long side in a rectangular cross-section of a coil. The oblique side portion except for the portion in the vicinity of the peak portion of the mountain shape and the portions in the vicinity of the opposing mountain-foot portions is bent at a radius of curvature 20 to 60 times as large as that for a long side in the rectangular cross-section of a coil. The straight portion extending from the slot is not bent.

Therefore, by providing additional insulating layer Z2 in the oblique side portion except for the portion in the vicinity of the peak portion in the mountain shape and the portions in the vicinity of the opposing mountain-foot portions and/or in the straight portion, additional insulating layer Z2 can readily and reliably be formed, and lowering in insulation due to crack or peel-off of additional insulating layer Z2 can effectively be prevented.

The number of segment coils 12 forming the U-phase, the V-phase, and the W-phase, a shape of segment coil 12, a shape of annular core 11, or a construction of motor 1 is not limited to that in the present embodiment and can be changed as appropriate.

Though the insulating layer forming step is performed after the coil element forming step in the embodiment of the present invention, limitation thereto is not necessarily intended.

For example, elemental wire R is prepared, the base insulating layer forming step is initially performed, thereafter the coil element forming step is performed, and the additional insulating layer forming step can further subsequently be performed. Thus, an insulating material which is in good balance between insulation performance and cost can be selected.

A segment coil according to a second embodiment of the present invention will now be described with reference to FIGS. 14 to 18.

Since the segment coil according to the second embodiment of the present invention is similar in construction to the already described segment coil except for a construction of an additional insulating layer described below, detailed description of a basic construction of the segment coil will not be provided.

Figure 14:
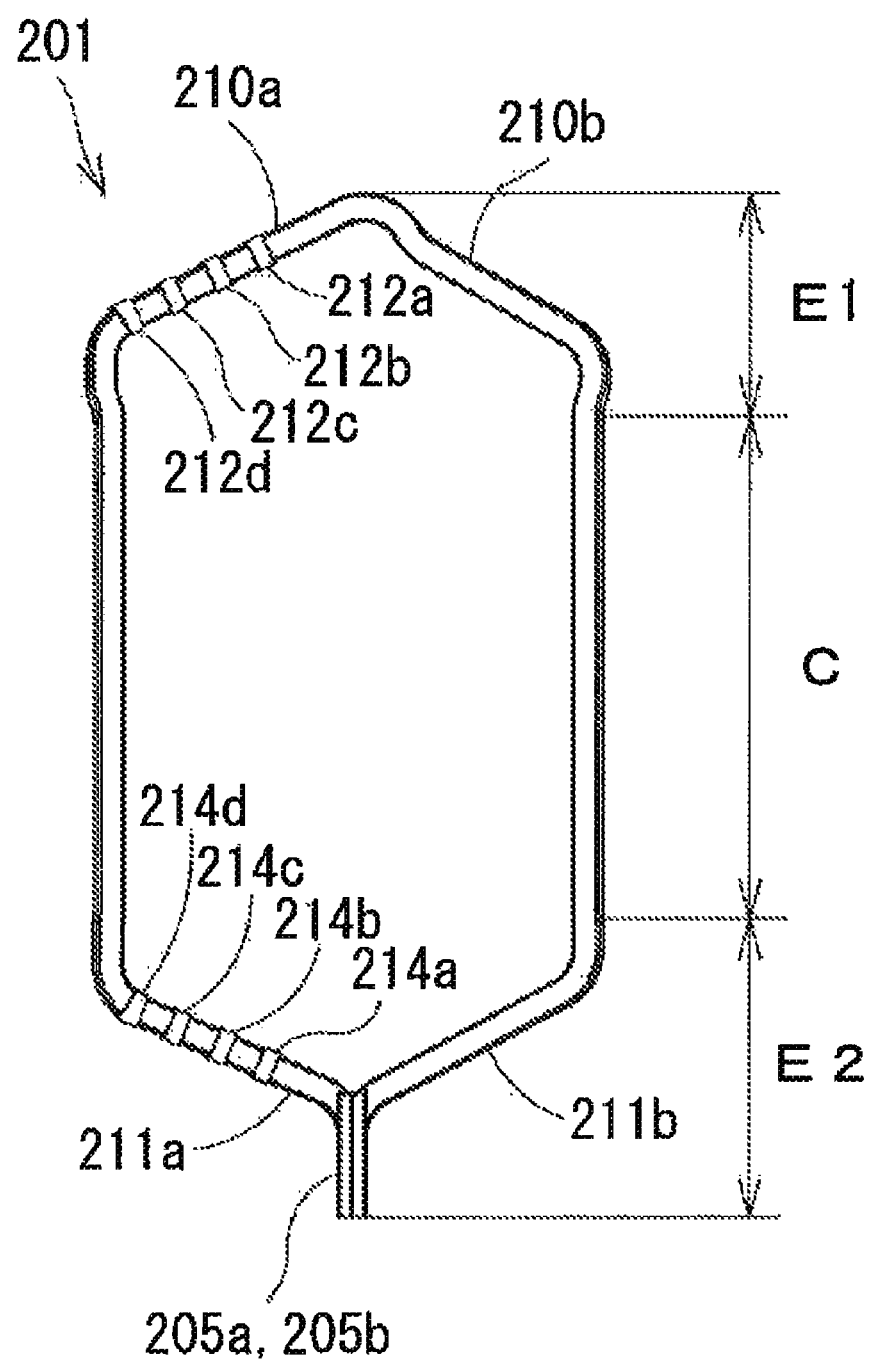
FIG. 14 is a front view showing a segment coil according to a second embodiment of the present invention.

As shown in FIG. 14, a segment coil 201 in a representative form attached to each slot portion 11c of stator 10 as shown in FIGS. 3A and 3B is formed substantially in a hexagonal shape including a pair of straight portions C accommodated in slot portion 1c and a pair of coil end portions E1 and E2 extending from opposing end portions in an axial direction of slot portion 11c and having a mountain shape. In coil end portion E2, adjacent segment coils attached to the same slot portion 11c are connected and connection to a segment coil attached to another slot is also made. For connection to a segment coil attached to another slot, segment coils attached on an innermost side and an outermost side in a radial direction of the stator are provided with coil end portions in a plurality of forms in accordance with a connection pattern. The description below is given for segment coil 201 in a form shown in FIG. 14 for facilitating understanding.

One coil end portion E1 is formed in a mountain shape which connects in a bridging manner, a pair of straight portions C accommodated in prescribed slot portion 11c. The other coil end portion E2 is provided with tip end portions for joint 205a and 205b for connection to a segment coil adjacently accommodated in slot portion 11c and a mountain shape is formed in cooperation with a coil end portion of a connected segment coil.

Figure 15:
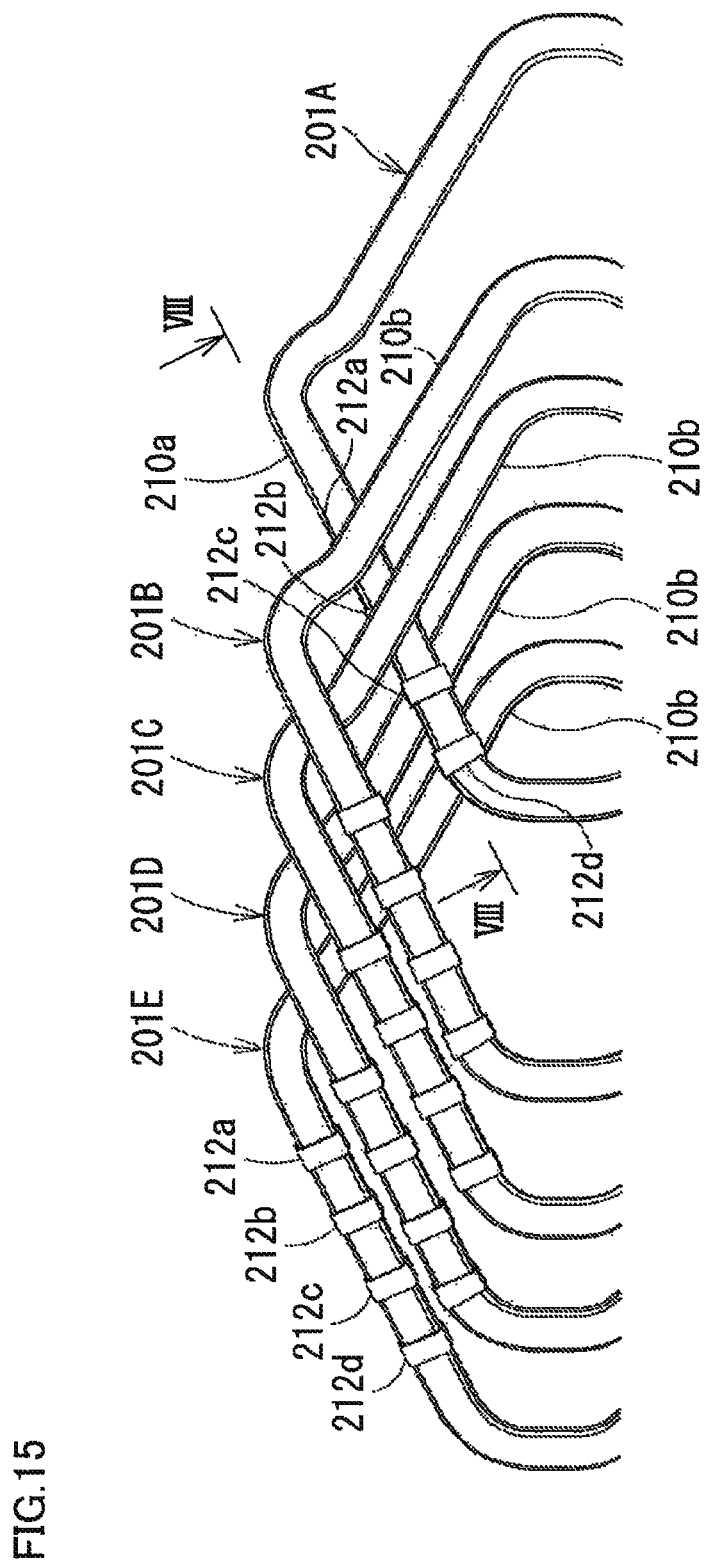
FIG. 15 is a front view of a main portion showing a state of facing between one segment coil and a segment coil arranged adjacently thereto.
Figure 17:
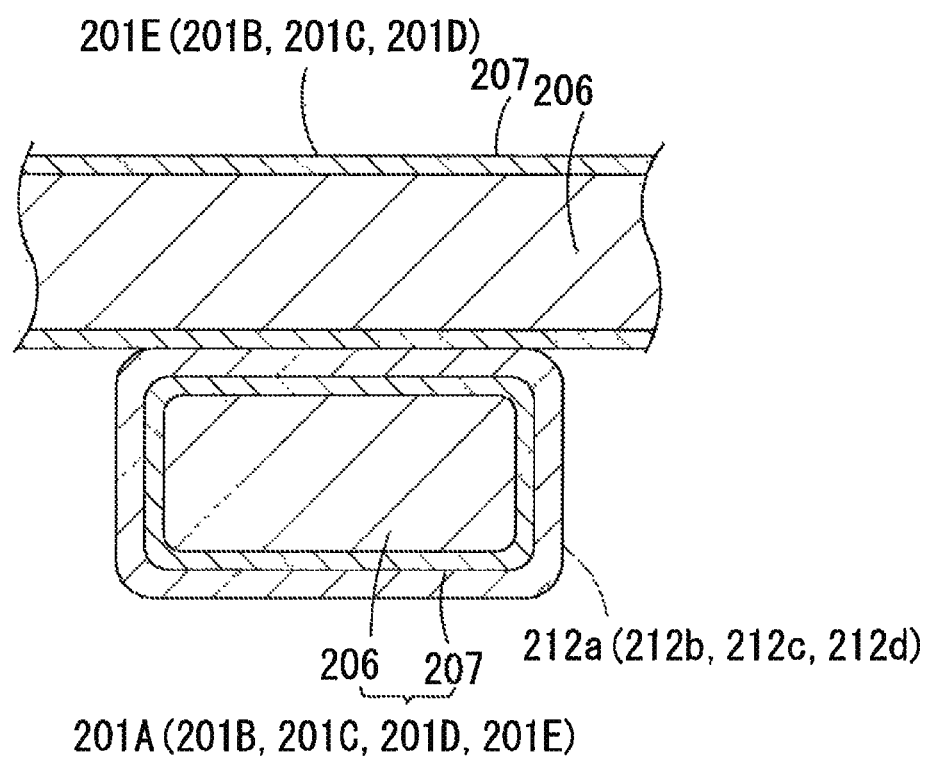
FIG. 17 is a cross-sectional view along the line XI-XI in FIG. 16.

As shown in FIGS. 15 and 17, in segment coils 201A to 201E, a base insulating layer 207 is formed around the entire outer perimeter except for tip end portions for joint 205a and 205b of a conductive elemental wire 206 having a rectangular cross-section. Base insulating layer 207 is formed to an even thickness over the entire outer perimeter of a coil material 206 to a thickness from 5 to 25 μm with the use of a material resistant to bending such as polyimide.

As shown in FIG. 14, in one oblique side portion 210a, 211a of coil end portion E1, E2 formed in the mountain shape in segment coil 201 according to the present embodiment, additional insulating layers 212a, 212b, 212c, 212d, 214a, 214b, 214c, and 214d are formed. It is noted that an oblique side portion where an additional insulating layer is to be provided may be oblique side portions 210b and 211b on the opposite side. An additional insulating layer may be provided in different oblique side portions in upper and lower coil end portions E1 and E2. It is noted that an additional insulating layer is provided in an oblique side portion on the same side of each segment coil in one coil end portion.

As shown in FIG. 17, additional insulating layers 212a, 212b, 212c, 212d, 214a, 214b, 214c, and 214d according to the present embodiment are formed by applying in stack an insulating polyamide imide resin paint material on base insulating layer 207 around the entire perimeter of a prescribed width to a prescribed thickness. Though a thickness of additional insulating layers 212a, 212b, 212c, 212d, 214a, 214b, 214c, and 214d is not particularly limited, for example, they can be formed to a thickness from 50 to 200 μm depending on a voltage difference between segment coils facing each other.

In the present embodiment, among coils which form phases of a three-phase AC motor, four coils are disposed in a state abutting to or proximate to oblique side portions 210a and 210b in the mountain shape in coil end portion E1 of segment coils 201A to 201E including segment coils arranged on the radially innermost side and on the radially outermost side of stator 10 shown in FIGS. 3A and 3B.

FIG. 15 is a front view schematically representing one segment coil 201A and segment coils 201B, 201C, 201D, and 201E facing one oblique side portion 210a of this segment coil 201A as extracted.

As shown in this figure, respective right oblique side portions 210b of four adjacent segment coils 201B, 201C, 201D, and 201E face left oblique side portion 210a in the figure of one segment coil 201A, as intersecting at prescribed intervals.

In the present embodiment, in left oblique side portion 210a of one segment coil 201A, additional insulating layers 212a to 212d are formed in a portion which other segment coils 201B1, 201C, 201D, and 201E face.

Figure 16:
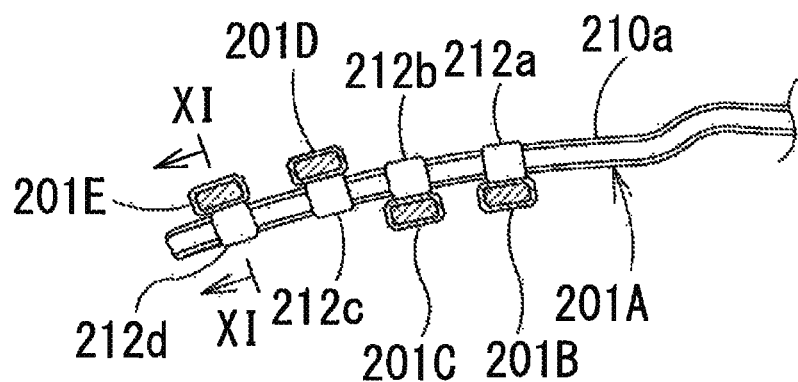
FIG. 16 is a cross-sectional view along the line VIII-VIII in FIG. 15.

FIG. 16 is a cross-sectional view along the line VIII-VIII in FIG. 15. As shown in FIG. 16, in the present embodiment, additional insulating layers 212a, 212b, 212c, and 212d are provided in left oblique side portion 210a of coil end portion E1, E2 in the mountain shape of each segment coil. Additional insulating layers 212a, 212b, 212c, and 212d expand a gap from facing segment coils 201B, 201C, 201D, and 201E so that partial discharge between segment coils facing each other in coil end portion E1 can be prevented.

Furthermore, additional insulating layers 212a to 212d are provided only in segment coil 201A, on one facing side. Therefore, in a whole coil forming a stator, a region where additional insulating layers 212a to 212d are provided can be small. Partial discharge can efficiently be prevented and a material necessary for providing additional insulating layers 212a to 212d can be reduced, to thereby reduce manufacturing cost. In addition, a weight of a motor can also be reduced.

Since no additional insulating layer is formed in a portion accommodated in slot portion 11c, a large cross-sectional area of a conductor in slot portion 11c can be set. Therefore, a space factor in slot portion 11c can be improved and efficiency of a motor can be enhanced.

An adjacent segment coil is arranged only on one side in the radial direction of segment coils 201B and 201E arranged on the radially outermost side and on the radially innermost side of the stator, respectively, and segment coils 201B and 201E are each coupled to a segment coil of the same phase attached to another slot. Therefore, depending on design, a portion to face an adjacent segment coil is different. Therefore, an additional insulating layer should only be provided in a portion facing another segment coil, depending on a construction of a segment coil in stator 10.

Though additional insulating layers are provided among all facing segment coils in coil end portions E1 and E2 in the present embodiment, additional insulating layers can also be provided only in a portion where segment coils belonging to different phases great in voltage difference face each other. Thus, a region where an additional insulating layer is provided can further be reduced. Since an additional insulating layer is provided between segment coils belonging to different phases where partial discharge is likely, partial discharge can more effectively be prevented.

Figure 18:
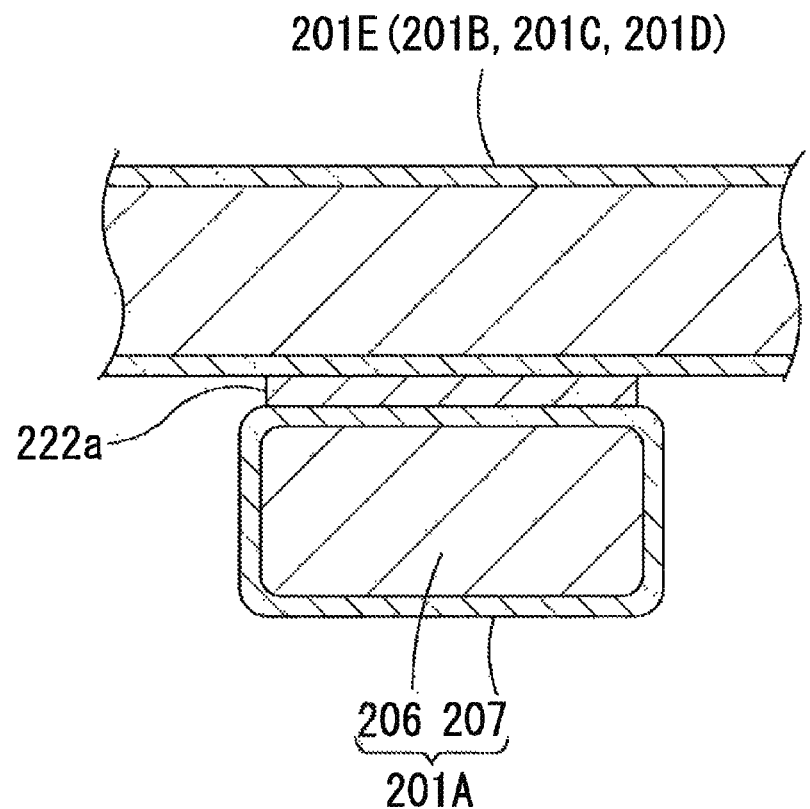
FIG. 18 is a diagram showing a second example of an additional insulating layer and a cross-sectional view corresponding to FIG. 17.

Though additional insulating layers 212a to 212d are provided to surround a perimeter of one segment coil 201A with a prescribed width in the embodiment shown in FIG. 17, they can be provided only in a surface where other segment coils 201B to 201E face segment coil 201A. For example, as shown in FIG. 18, in one segment coil 201A, an additional insulating layer 112a can be formed only in radially inner and outer surfaces of stator 10 where other segment coils 201B to 201E face segment coil 201A. By adopting this construction, a region where an additional insulating layer is to be provided can further be reduced.

Though additional insulating layers 212a to 212d are formed of an insulating resin paint material in the present embodiment, limitation thereto is not intended. For example, additional insulating layers 212a to 212d can be formed of an insulating resin tube material. For example, a heat-shrinkable tube material such as an insulating resin tube material (trade name Sumitube) manufactured by Sumitomo Electric Industries, Ltd. can be adopted as the insulating tube material.

Alternatively, additional insulating layers 212a to 212d can be formed of an insulating resin tape material. For example, an insulating resin tape material (trade name Kapton tape) manufactured by Permacel can be adopted.

An area where an additional insulating layer is to be provided is not particularly limited either. Though additional insulating layers 212a to 212d are formed only in a portion in one oblique side portion 210a of one segment coil 201A which other segment coils 201B to 201D face in the present embodiment, they can also be formed in entire one oblique side portion 210a.

Each of segment coils 201A to 201E is formed by bending in advance a conductor having a large cross-sectional area. When an additional insulating layer is provided at a site of bending before bending, crack or peel-off may take place in the additional insulating layer and insulation may lower. Even after bending, it may be difficult to provide an additional insulating layer at a bent site. For example, it is difficult to form an additional insulating layer in a bent portion with the use of a tape material or a tube material. Therefore, in forming an additional insulating layer of a film material or a tube material, an additional insulating layer is preferably provided in a portion which is not bent.

A segment coil according to a third embodiment of the present invention will now be described with reference to FIGS. 19 to 21.

Since the segment coil according to the third embodiment of the present invention is similar in construction to the already described segment coil except for a construction of an insulating layer and a semiconductive layer described below, detailed description of a basic construction of the segment coil will not be provided.

Figure 19:
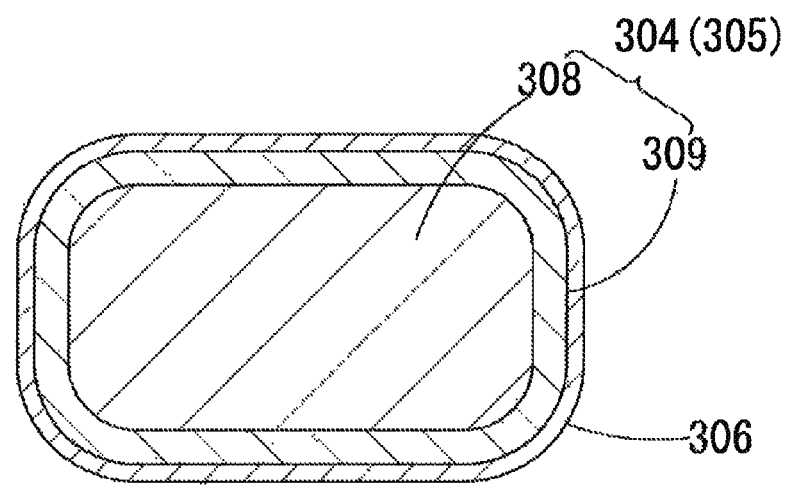
FIG. 19 is a cross-sectional view showing a segment coil according to a third embodiment of the present invention.

As shown in FIG. 19, in segment coils 304 and 305 according to the present embodiment, an insulating layer 309 is provided on an outer peripheral surface of a conductive elemental wire 308 having a rectangular cross-section.

In addition, in the present embodiment, a semiconductive layer 306 is provided in a prescribed region of coil end portions E1 and E2 extending from slot portion 11c of segment coils 304 and 305 provided with insulating layer 309, and semiconductive layers 306 and 306 of segment coils 304 and 305 arranged in proximity and belonging to different phases are in contact at at least one point V.

Figure 21:
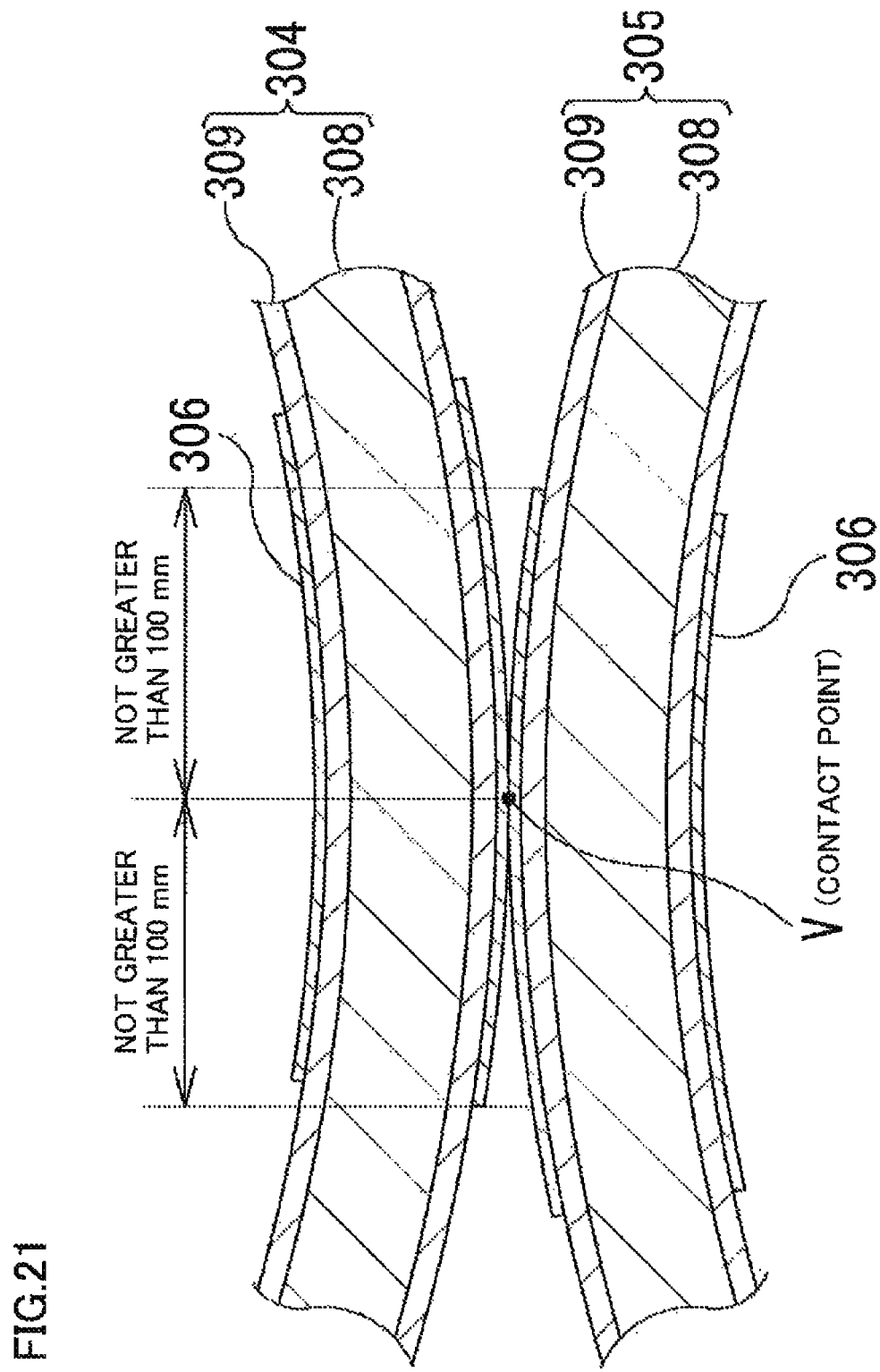
FIG. 21 is a cross-sectional view schematically showing a state of contact of a semiconductive layer provided in a coil.

As shown in FIG. 21, semiconductive layer 306 is provided at least in a region not smaller than a largest cross-sectional width of a segment coil in opposing directions along an axial line of the segment coil, with a contact point being defined as the center. For example, in a case that a coil having a rectangular cross-section is adopted, semiconductive layer 306 is preferably provided in a region not shorter than a length of a diagonal line of the rectangular cross-section, with the contact point above being defined as the center. In the present embodiment, semiconductive layer 306 is provided in an area not smaller than the largest cross-sectional width of the segment coil and not greater than 100 mm. A thickness of semiconductive layer 306 is not particularly limited and semiconductive layer 306 can be formed, for example, to a thickness from 5 to 100 μm.

Figure 20:
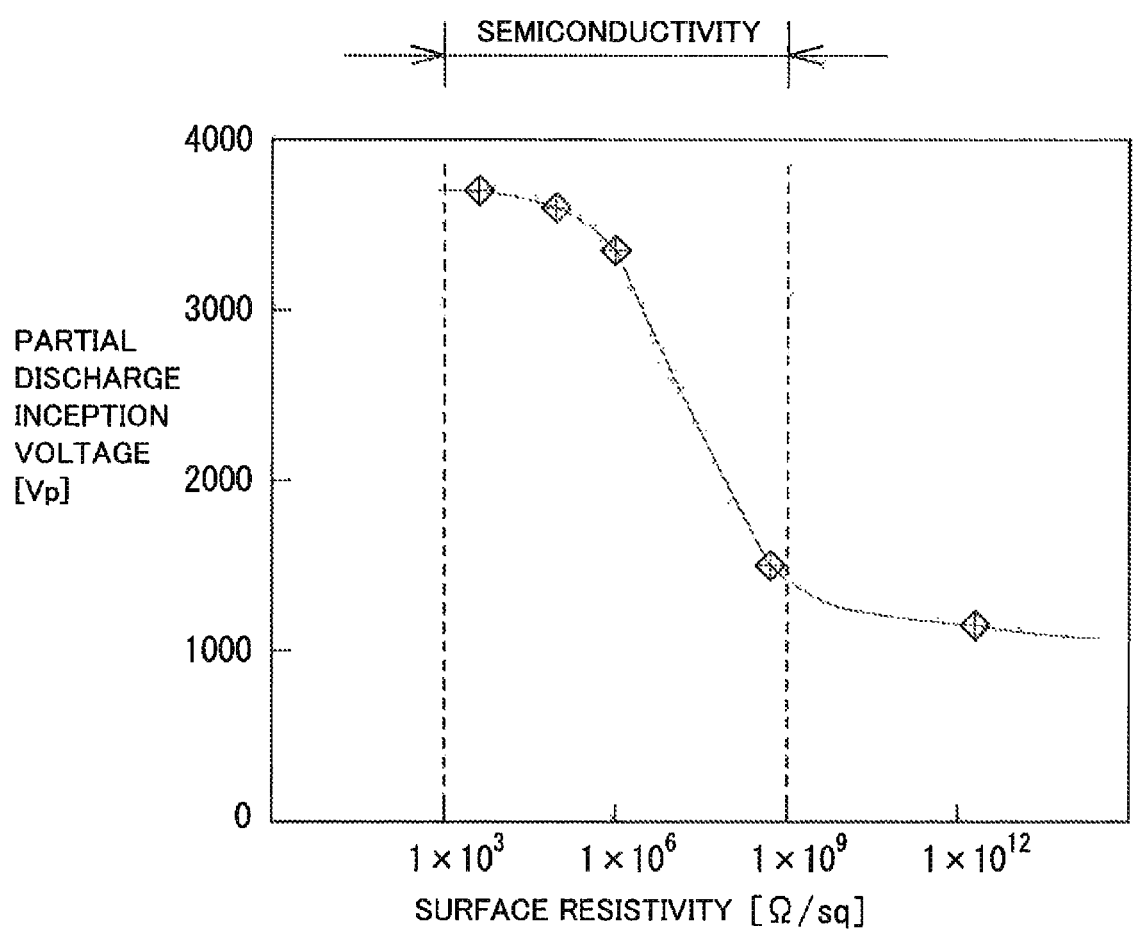
FIG. 20 is a diagram showing relation between a partial discharge inception voltage and surface resistivity.

As shown in FIG. 20, surface resistivity of semiconductive layer 306 is set to $1\times10^3$ to $1\times10^9$ Ω/sq, and a heat-shrinkable tube in which a conductive material is blended in a fluorine-based resin such as PFA or FEP is attached in an area extending by 100 mm in each of opposing directions with contact point V above being defined as the center. A tape material having semiconductivity such as a Kapton adhesive tape (registered trademark of DuPont USA) or aramid non-woven fabric (Nikkan Industries Co., Ltd., #5183, 65 nm) can be adopted.

As shown in FIG. 20, since semiconductive layer 306 has surface resistance of $1\times10^3$ to $1\times10^9$ Ω/sq, a partial discharge inception voltage can be raised to 1000 V or higher. In the present embodiment, semiconductive layers 306 and 306 of segment coils 304 and 305 are opposed to each other in an area extending by 100 mm in each of opposing directions with contact point V lying therebetween, and a partial discharge inception voltage across these semiconductive layers 306 and 306 is set to 1000 V or higher. Therefore, a partial discharge prevention effect in the vicinity of contact point V can be obtained.

In a case that a semiconductive layer is provided in a region of 200 mm or greater, contact point V is preferably set every 200 mm in order to obtain a reliable effect. By setting semiconductive layer 306 as above, a partial discharge inception voltage across segment coils 304 and 305 proximate to each other in this region can be raised to 1000 V or higher.

Semiconductive layer 306 can be set to be very thin as compared with a conventional insulating layer provided for prevention of partial discharge. Therefore, partial discharge can effectively be prevented without increase in weight or cost of a stator.

A segment coil according to a fourth embodiment of the present invention will now be described with reference to FIGS. 22 to 26B.

Since the segment coil according to the fourth embodiment of the present invention is similar in construction to the already described segment coil except for a construction of a colored identification portion described below, detailed description of a basic construction of the segment coil will not be provided.

Figure 22:
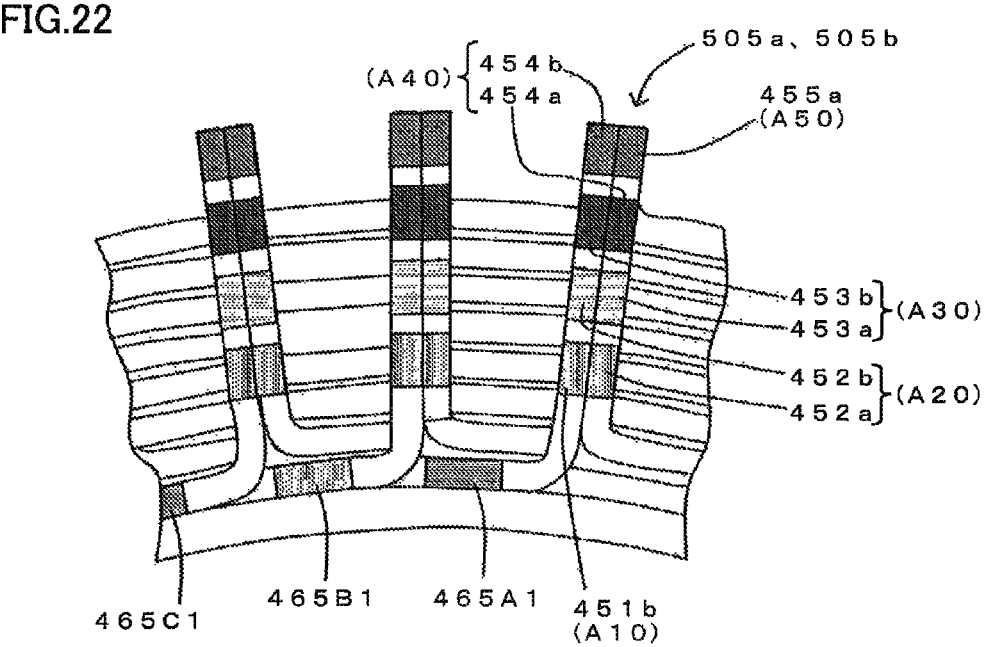
FIG. 22 is an enlarged plan view of a tip end portion for joint of a segment coil of a stator including the segment coils according to a fourth embodiment of the present invention.
Figure 23:
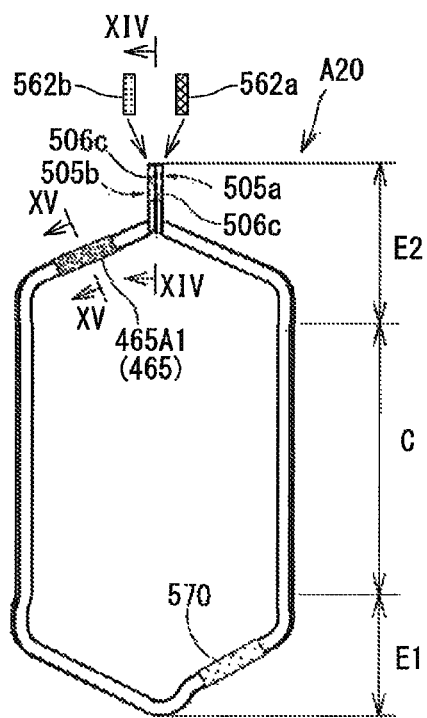
FIG. 23 is a front view showing a variation of the segment coil according to the fourth embodiment of the present invention.

As shown in FIG. 22, first colored identification portions 451b, 452a, 452b, 453a, 453b, 454a, 454b, and 455a allowing identification of tip end portions for joint 505a and 505b of a series of connected segment coils A10 to A50 are provided. Basically, in segment coils A20 to A40 located in an intermediate portion, straight portions C shown in FIG. 23 are attached to the same slot. At least one of segment coil A10 arranged on the radially innermost side of the stator and segment coil A50 arranged on the radially outermost side of the stator is connected to a coil end portion extending from a straight portion attached to another slot.

First colored identification portions 451b, 452a, 452b, 453a, 453b, 454a, 454b, and 455a according to the present embodiment are formed by forming coil end surfaces of tip end portions for joint 505a and 505b of segment coils A10 to A50 to be flat and applying color paints to these flat surfaces.

Colored identification portions 451b, 452a, 452b, 453a, 453b, 454a, 454b, and 455a are obtained by applying a paint of the same color to tip end portions for joint connected to each other. The embodiment is drawn such that the same pattern has the same color. Namely, as shown in FIG. 22, colored identification portion 452b formed in segment coil A20 and colored identification portion 453a formed in segment coil A30 are in the same color. Similarly, as shown in FIG. 22, colored identification portion 451b and colored identification portion 452a, colored identification portion 453b and colored identification portion 454a, and colored identification portion 454b and colored identification portion 455a are different in color for each set. Therefore, by connecting through welding or ultrasound, tip end portions for joint having the colored identification portion in the same color formed, a plurality of segment coils A10 to A50 belonging to the same phase are connected to thereby form a series of coils.

End surfaces of tip end portions for joint 505a and 505b of segment coils are sites reliably visually recognized from outside of the stator. By providing a first colored identification portion on a coil end surface, a connection operation can be performed with tip end portions for joint 505a and 505b of segment coils to be connected to each other reliably being identified.

Since the colored identification portions of segment coils connected to each other are in the same color, whether or not segment coils in the same color are connected to each other can also automatically be determined by observing end surfaces of the tip end portions for joint with an image recognition apparatus after connection. Therefore, not only an operation for assembling a stator but also a checking operation can extremely efficiently be performed.

A technique for forming a colored identification portion is not particularly limited. For example, first colored identification portions 451b, 452a, 452b, 453a, 453b, 454a, 454b, and 455a can be formed by applying color paints.

In the present embodiment, second colored identification portion 465A1, 465B1, 465C1, 465D1 (not shown) for identifying a segment coil assembled in each slot portion 11c is provided in one oblique side portion of coil end portion E2 of each of segment coils A10 to A50. Second colored identification portions 465A1, 465B1, 465C1, and 465D1 are obtained by providing colored layers having the same color in segment coils A10 to A40 accommodated in the same slot.

By providing second colored identification portions 465A1, 465B1, 465C1, and 465D1, a prescribed segment coil can readily be attached to a prescribed slot.

In the present embodiment, as shown in FIG. 23, a second colored identification portion 570 for disposition identification which allows identification of an order of disposition of segment coils accommodated in the same slot is provided.

Second colored identification portion 570 for disposition identification is provided independently in coil end portion E1 opposite to coil end portion E2 where second colored identification portion 465A1, 465B1, 465C1, 465D1 for slot identification is provided. Second color identification 570 for disposition identification can be formed, for example, by providing coloring in the same color and different in density in accordance with an order of disposition. After assembly, colored identification portions different in color can appear alternately in segment coils attached to the same slot.

By providing second colored identification portion 570 for disposition identification, an assembly operation can be performed, with an order of assembly (disposition) of segment coils assembled into each slot being readily identified.

Figure 25:
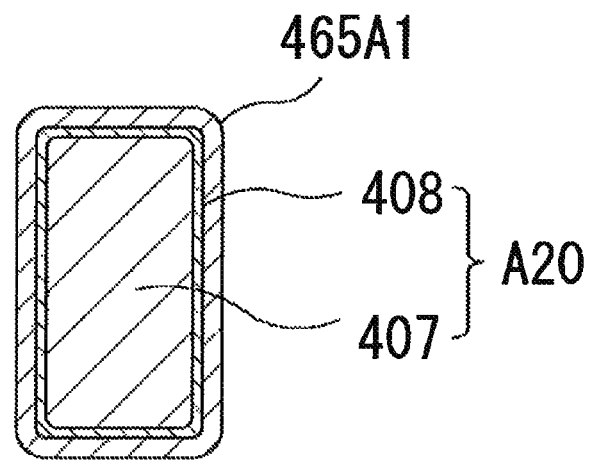
FIG. 25 is a cross-sectional view along the line XV-XV in FIG. 23.

A construction and a form of second colored identification portions 465A1, 465B1, 465C1, and 465D1 are not particularly limited. For example, as shown in FIG. 25, likewise the first colored identification portion, second colored identification portion 465A 1 can be formed by applying a paint having a corresponding color to a prescribed region on an insulating layer 408 provided in an elemental wire 407.

The second colored identification portion can be obtained by bonding a color tape material or attaching a color tube material to a prescribed region in a segment coil. For example, an insulating resin tape material (trade name Kapton tape) manufactured by Permacel can be adopted as the color tape material. A heat-shrinkable tube material such as an insulating resin tube (trade name Sumitube) manufactured by Sumitomo Electric Industries, Ltd. can be adopted as the color tube material. By adopting an insulating paint or tape material or tube material, the second colored identification portion can function as an additional insulating layer. Thus, not only an operation for assembly or an operation for connection of segment coils can readily be performed but also partial discharge between adjacent segment coils can effectively be prevented.

FIG. 23 shows a second variation in connection with the first colored identification portion. In the second variation, the first colored identification portion is implemented by providing color caps 562a and 562b in tip end portions for joint 505a and 505b.

Since tip end portions for joint 505a and 505b are formed by removing an insulating layer, oxidation of a conductor surface or adhesion of grease thereto is likely during handling or storage. By providing a color cap, the exposed conductor surface can be protected.

Figure 24:
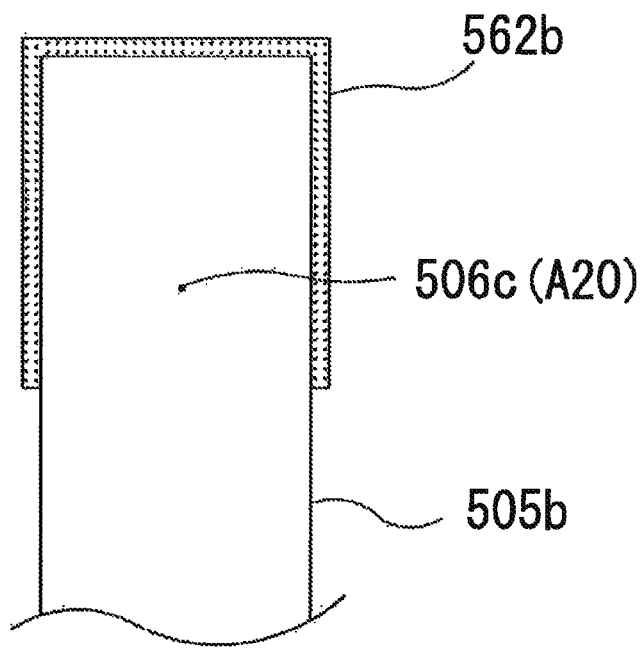
FIG. 24 is a right side view along the line XIV-XIV in FIG. 23.

As shown in FIG. 24, the color cap according to the present embodiment is formed from a resin molded product in a form covering a surface except for a connection surface 506c. By adopting such a construction, connection can be made while color caps 562a and 562b remain attached.

A material forming the color cap is not particularly limited and a color cap molded from a colored resin material or a color cap formed from a metal material followed by coloring can be adopted.

The colored identification portion described already can be formed by performing a colored identification portion forming step of providing prescribed coloring to a prescribed region of a surface of a coil element simultaneously with or subsequent to the additional insulating layer forming step.

A segment coil according to a fifth embodiment of the present invention will now be described with reference to FIGS. 26A and 26B.

Since the segment coil according to the fifth embodiment of the present invention is similar in construction to the already described segment coil except for an inclined region K described below, detailed description of a basic construction of the segment coil will not be provided.

Figure 26A:
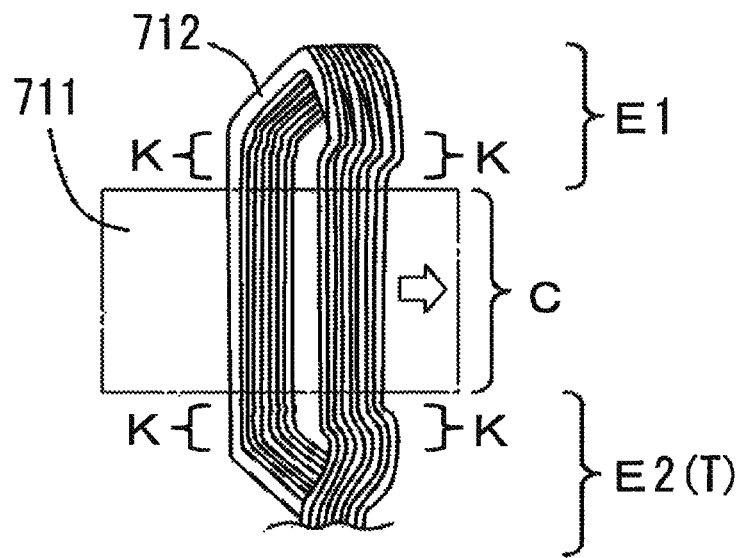
FIG. 26A is a perspective view showing in a simplified manner, a state that segment coils according to a fifth embodiment of the present invention are arranged as aligned in the same slot portion.

As shown in FIG. 26A, in a region of a pair of coil end portions E1 and E2 except for thick region A which will be described later, inclined region K inclined radially outward of an annular core 711 is provided. It is noted that a direction shown with a hollow arrow indicates radially outward in FIGS. 26A and 26B.

Specifically, segment coils arranged adjacently in the same slot of a stator are radially inclined in a region extending from the slot to a portion where it is bent in a circumferential direction toward the peak portion of the coil end portion, so that an insulating layer provided in the coil end portion of the segment coil is brought in contact in a radial direction of the stator. The insulating layer is formed such that a distance between coils in the radial direction of the stator at a portion of contact is greater than a distance between coils in the slot.

The "distance between coils" here means a distance between centers of adjacent segment coils 712 in a radial direction of an annular core.

Figure 26B:
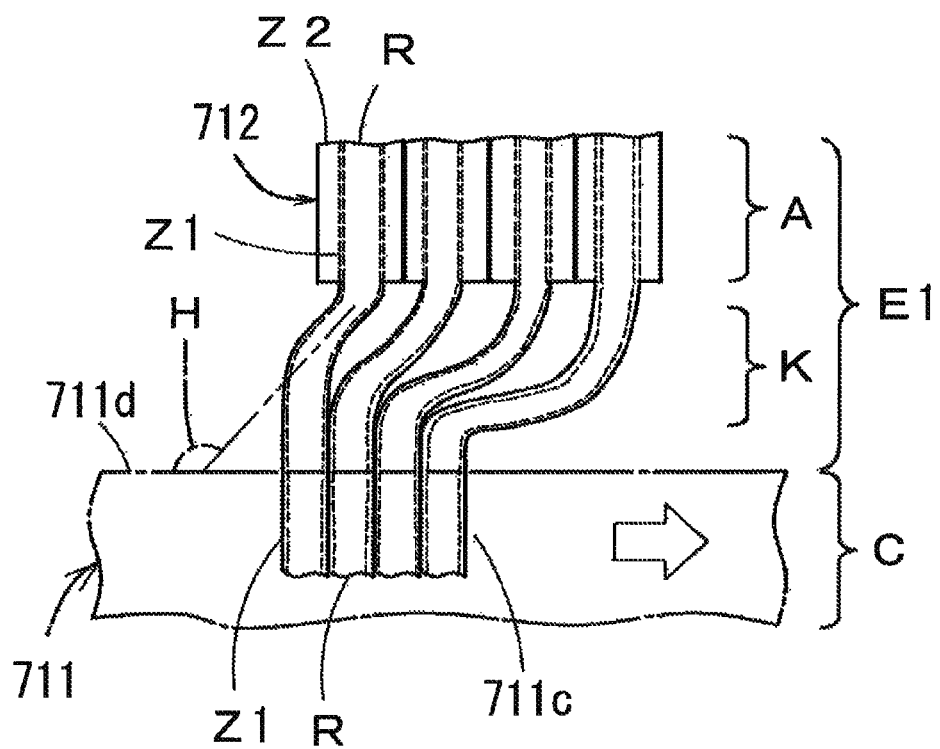
FIG. 26B is a diagram showing in a simplified manner, a state that the segment coils according to the fifth embodiment of the present invention are arranged as aligned in the same slot portion and a diagram schematically showing a main portion of a side surface of the segment coils.

As partially shown in FIG. 26B, inclined region K is set within an area in coil end portions E1 and E2 approximately 500 μm to 5 mm from an end surface 711d of annular core 711 in an axial direction of annular core 711.

As shown in FIG. 26B, an angle of inclination means an angle H formed between segment coil 712 forming inclined region K and end surface 711d of annular core 711.

In the present embodiment, a thickness of an insulating layer in segment coil 712 is different between straight portion C and coil end portions E1 and E2.

More specifically, in straight portion C, an insulating layer is formed by covering the surface of elemental wire R only with base insulating layer Z1. In contrast, in a prescribed region in a region except for inclined region K in coil end portions E1 and E2, thick region A is formed by covering the surface of elemental wire R with base insulating layer Z1 and covering the surface of base insulating layer Z1 further with additional insulating layer Z2.

It is noted that the "prescribed region" here means a region of coil end portions E1 and E2 including a site where insulating layers of adjacent segment coils 712 are brought in contact with each other.

FIG. 26B illustrates thick region A as exaggerated for the sake of convenience of illustration.

Any elemental wire R may be employed so long as it is a normally used elemental wire forming a coil, for example, of copper.

Polyamide imide or polyimide can be employed as a material for base insulating layer Z1. A thickness of base insulating layer Z1 should only comply with a design voltage between coil turns. For example, when a design voltage is 500 V, desirably, a thickness is approximately from 15 μm to 30 μm and more suitably approximately from 15 μm to 25 μm. When a thickness is smaller than 15 μm, probability of deterioration of a film due to partial discharge or occurrence of pin holes during manufacturing increases. When a thickness exceeds 25 μm, lowering in assembly performance due to increase in heat generation or increase in outer diameter caused by lowering in space factor in slot portion 11c is caused. Pulling through a die or electrodeposition can be employed as a formation method. It is noted that base insulating layer Z1 for straight portion C and coil end portions E1 and E2 can integrally be formed in the same step.

A super engineering plastic material represented by polyamide imide or polyimide or a material in which an inorganic filler is mixed in engineering plastic can be used as a material for additional insulating layer Z2. Pulling through a die, electrodeposition, powder coating, adhesion of a tape, dipping, spray coating, insert injection molding, or extrusion can be employed as a formation method.

Since a peak voltage approximately twice as high as an input voltage is applied as a voltage between motor phases due to influence by inverter surge, for example, when a design voltage is 1000 V, desirably, a thickness of additional insulating layer Z2 is approximately from 40 μm to 200 μm and more preferably approximately from 80 μm to 120 μm. When a thickness is smaller than 40 μm, a film is deteriorated due to partial discharge. When a thickness exceeds 200 µm, a dimension due to increase in conductor spacing at a coil end increases.

By adopting the construction above, segment coils 712 arranged adjacently in the same slot can effectively be brought in close contact between straight portions C and between coil end portions E1, E2.

In particular, in the present embodiment, in adjacent segment coils 712 arranged in the same slot, base insulating layer Z1 for straight portion C and additional insulating layer Z2 forming thick region A of coil end portions E1 and E2 are brought in close contact without a gap. Thus, a high space factor in a slot can be achieved and the number of turns of a coil in the slot can be increased.

Corona discharge described already is likely in a region where a gap between adjacent segment coils is small. In the present embodiment, particularly, corona discharge between adjacent segment coils 712 of the same phase can effectively be prevented.

Thus, a stator capable of maintaining good insulation, which allows effective prevention of deterioration of base insulating layer Z1 and additional insulating layer Z2 involved with corona discharge between adjacent segment coils 712 of the same phase, can be obtained.

Angle of inclination H of segment coil 712 and a length of segment coil 712 may each be different. In forming a stator, in adjacent segment coils 712 arranged in the same slot 711*c*, angle of inclination H of a coil in region K should be such that an angle of inclination of segment coil 712 arranged on the outer circumferential side of annular core 711 is greater than an angle of inclination of segment coil 712 arranged on the inner circumferential side of annular core 711 and a length of region K should be such that a length of segment coil 712 arranged on the outer circumferential side of annular core 711 is longer than a length of segment coil 712 arranged on the inner circumferential side of annular core 711.

Though all adjacent segment coils 712 in the same slot are in contact in the radial direction of the annular core in straight portion C and in thick region A of coil end portions E1 and E2 in the present variation, limitation thereto is not necessarily intended, and the construction can be changed as appropriate so long as at least one set of adjacent segment coils 712 arranged in the same slot are in contact in the radial direction of the annular core in straight portion C and in thick region A of coil end portions E1 and E2.

The scope of the present invention is not limited to the embodiments described above. It should be understood that the embodiments disclosed herein are illustrative and non-restrictive in every respect. The scope of the invention of the present application is defined by the terms of the claims, rather than the meaning described above, and is intended to include any modifications within the scope and meaning equivalent to the terms of the claims.

INDUSTRIAL APPLICABILITY

The present invention can be made use of in a motor in which electric power switched by inverter control is supplied to a coil.

The invention claimed is:

1. A segment coil in a stator of a rotating electric machine formed from an annular core and rectangular wire coils of a plurality of phases, segment coils being arranged as aligned in a radial direction in slots of the annular core and coils in adjacent slots being arranged as aligned in a circumferential direction, comprising:

a straight portion accommodated in said slot; and
a pair of coil end portions protruding outward from said slot,
a tip end of any one coil end portion of said pair of coil end portions being defined as a tip end portion for joint including a joint surface for joint to another segment coil, and
said tip end portion for joint being constructed such that the joint surface is in parallel to a radial direction of said annular core when viewed in an axial direction of said annular core, wherein
said segment coil has a pair of said tip end portions for joint arranged at prescribed positions in the circumferential direction of the annular core, and the pair of tip end portions for joint are arranged such that adjacent tip end portions for joint are displaced between an inner-diameter-side and an outer-diameter-side in the radial direction of said annular core when the segment coils are arranged as aligned in the slots of said annular core,
among the segment coils accommodated in the same slot, the segment coils adjacent in the radial direction of said annular core are joined at said tip end portions for joint, and
said pair of tip end portions for joint are formed by twisting end portions of said pair of coil end portions by 90 degrees in the same direction.

2. The segment coil according to claim 1, wherein
an additional insulating layer is provided in a prescribed region of a coil end portion including at least said tip end portion for joint, of said pair of coil end portions.

3. The segment coil according to claim 2, wherein
said additional insulating layer is provided in a portion where segment coils belonging to different phases face each other.

4. The segment coil according to claim 2, wherein
said additional insulating layer is formed on a radially inner surface and/or a radially outer surface of the annular core of the segment coil.

5. The segment coil according to claim 2, wherein
said coil end portion is formed in a mountain shape, and said additional insulating layer is provided in an oblique side portion except for a portion near a peak portion of said mountain shape and portions near opposing mountain-foot portions and/or in a straight portion extending from the slot.

6. The segment coil according to claim 1, wherein
a semiconductive layer is provided in a prescribed region of a coil end portion on a side not including at least said tip end portion for joint, of said pair of coil end portions, and said semiconductive layer of a segment coil arranged in proximity and belonging to a different phase is in contact at at least one point.

7. The segment coil according to claim 1, wherein
a colored identification portion is provided on a surface in a prescribed region of said segment coil.

8. The segment coil according to claim 7, wherein
a first colored identification portion allowing identification of a tip end portion for joint of a segment coil to be connected is provided in the tip end portion for joint of said segment coil or in a portion near the tip end portion for joint.

9. The segment coil according to claim 7, comprising a second colored identification portion provided on a surface other than said tip end portion for joint and formed to allow identification of a slot where each segment coil is attached and/or a position of disposition in the slot.

10. The segment coil according to claim 9, wherein
said second colored identification portion is provided by applying a color paint, bonding a color tape material, or attaching a color tube material to a prescribed region of the segment coil.

11. The segment coil according to claim 9, wherein said second colored identification portion serves as an additional insulating layer.

12. The segment coil according to claim 1, composed of tough pitch copper.

13. A stator formed by arranging the segment coils according to claim 1 as aligned in slots of an annular core.

14. The stator according to claim 13, wherein
by inclining at least one set of adjacent segment coils arranged in a common slot among segment coils arranged as aligned in the slots of said annular core in a radial direction in a region extending from said slot to a portion where it is bent in a circumferential direction toward a vertex of said coil end portion, an insulating layer provided in a coil end portion of the segment coil is formed such that said insulating layer is brought in contact in the radial direction of the stator and a distance between coils in the radial direction of the stator at a portion in contact between said insulating layer and said coil end portion is greater than a distance between coils within said slot.

15. The stator according to claim 13, wherein
said tip end portions for joint of adjacent segment coils of said plurality of segment coils are solid-phase bonded.

16. A method of manufacturing the segment coil according to claim 1, comprising:
a coil element forming step of forming a coil element by bending an elemental wire formed at least from a rectangular wire; and
an insulating layer forming step of forming an insulating layer by covering a surface of said coil element with an insulating substance,
said coil element forming step including a tip-end-portion-for-joint forming step of forming at a tip end of a coil end portion of said coil element, a tip end portion for joint arranged at a prescribed position in a circumferential direction of an annular core such that a joint surface for joint to another segment coil is in parallel to a radial direction of said annular core when viewed in an axial direction of said annular core, and
said insulating layer forming step including a base insulating layer forming step of forming a base insulating layer by integrally covering said coil element with an insulating substance and an additional insulating layer forming step of forming an additional insulating layer by additionally covering a prescribed region of said coil end portion with an insulating substance after the base insulating layer forming step.

17. The method of manufacturing the segment coil according to claim 16, wherein
said tip-end-portion-for-joint forming step is performed by twisting an end portion of the coil end portion of said coil element.

18. The method of manufacturing the segment coil according to claim 16, wherein
said tip-end-portion-for-joint forming step is performed by plastically deforming an end portion of the coil end portion of said coil element.

19. The method of manufacturing the segment coil according to claim 16, comprising a colored identification portion forming step of providing prescribed coloring to a prescribed region on the surface of the coil element simultaneously with or subsequent to said additional insulating layer forming step.

20. The segment coil according to claim 1, wherein each of a segment coil on the inner-diameter-side and a segment coil on the outer-diameter-side is bent at a same angle inward in the circumferential direction of said annular core.

21. The segment coil according to claim 20, wherein by further bending said segment coil on the inner-diameter-side, the tip end portion for joint of said segment coil on the inner-diameter-side is arranged below said tip end portion of joint of said segment coil on the outer-diameter-side in the axial direction of said annular core.

* * * * *